(12) United States Patent  
Dykstra et al.

(10) Patent No.: US 7,561,943 B2  
(45) Date of Patent: Jul. 14, 2009

(54) METHODS FOR VOLUMETRICALLY CONTROLLING A MIXING APPARATUS

(75) Inventors: Jason D. Dykstra, Duncan, OK (US); Justin A. Borgstadt, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 569 days.

(21) Appl. No.: 11/323,322

(22) Filed: Dec. 30, 2005

(65) Prior Publication Data

US 2007/0153622 A1 Jul. 5, 2007

(51) Int. Cl.  
G05D 11/02 (2006.01)  
B01F 15/04 (2006.01)

(52) U.S. Cl. .................... 700/265; 166/285; 366/8; 366/15; 366/17; 366/19; 366/152.2; 700/285

(58) Field of Classification Search .......... 166/285, 166/250.14, 250.15; 366/17, 19, 8, 15, 152.2; 700/41, 42, 68, 239, 240, 265, 285  
See application file for complete search history.

(56) References Cited

U.S. PATENT DOCUMENTS

| | | | | |
|---|---|---|---|---|
| 1,657,761 A | * | 1/1928 | Novelli | 222/304 |
| 3,057,488 A | * | 10/1962 | Atkinson | 414/272 |
| 3,262,610 A | * | 7/1966 | Jordan | 222/440 |
| 3,591,147 A | * | 7/1971 | Anderson et al. | 366/142 |
| 3,609,316 A | * | 9/1971 | Brosset et al. | 700/239 |
| 3,843,099 A | * | 10/1974 | Duncan | 366/76.2 |
| 4,353,482 A | * | 10/1982 | Tomlinson et al. | 222/1 |
| 4,397,561 A | * | 8/1983 | Strong et al. | 366/21 |
| 4,432,064 A | * | 2/1984 | Barker et al. | 702/9 |
| 4,433,701 A | * | 2/1984 | Cox et al. | 137/101.19 |

(Continued)

FOREIGN PATENT DOCUMENTS

GB 225025 * 11/1924

(Continued)

OTHER PUBLICATIONS

K D Edgley. Automatic density control system improves cement slurry performance. Society of Petroleum Engineers paper SPE 14989, 1986.*

(Continued)

*Primary Examiner*—David L Sorkin  
*Assistant Examiner*—Andrew Janca  
(74) *Attorney, Agent, or Firm*—John W. Wustenberg; Groover & Associates

(57) ABSTRACT

Methods of controlling a volumetric ratio of a material to total materials in a mixing vessel are provided. In various embodiments, the methods may comprise: estimating the volumetric ratio of the material to the total materials in the mixing vessel and an output flowrate of the material from the mixing vessel using a volumetric ratio observer; dynamically recomputing the commanded input flowrate of the material based on outputs of the volumetric ratio observer using a flow regulator; and adjusting an input valve of the material based on the commanded input flowrate of the material using a flow modulator. The mixing vessel may include a first mixing vessel partially separated from a second mixing vessel. In this case, a height of the total materials in the second mixing vessel may be estimated using a height observer.

20 Claims, 9 Drawing Sheets

U.S. PATENT DOCUMENTS

| | | | |
|---|---|---|---|
| 4,642,766 A * | 2/1987 | Funk et al. | 705/7 |
| 4,654,802 A | 3/1987 | Davis | |
| 4,764,019 A * | 8/1988 | Kaminski et al. | 366/15 |
| 4,916,631 A * | 4/1990 | Crain et al. | 700/265 |
| 4,953,097 A * | 8/1990 | Crain et al. | 700/265 |
| 5,027,267 A * | 6/1991 | Pitts et al. | 700/67 |
| 5,038,971 A * | 8/1991 | Gayer et al. | 222/1 |
| 5,102,228 A * | 4/1992 | Vine-Lott | 366/3 |
| 5,103,908 A | 4/1992 | Allen | |
| 5,114,239 A * | 5/1992 | Allen | 366/6 |
| 5,125,533 A * | 6/1992 | Gayer et al. | 222/28 |
| 5,188,812 A * | 2/1993 | Hilakos | 423/320 |
| 5,190,374 A * | 3/1993 | Harms et al. | 366/165.2 |
| 5,240,324 A * | 8/1993 | Phillips et al. | 366/132 |
| 5,272,621 A * | 12/1993 | Aoki | 700/45 |
| 5,289,877 A * | 3/1994 | Naegele et al. | 166/285 |
| 5,365,435 A | 11/1994 | Stephenson | |
| 5,426,137 A * | 6/1995 | Allen | 523/318 |
| 5,441,176 A * | 8/1995 | Auee | 222/163 |
| 5,441,340 A * | 8/1995 | Cedillo et al. | 366/2 |
| 5,503,473 A * | 4/1996 | Dearing et al. | 366/2 |
| 5,522,459 A * | 6/1996 | Padgett et al. | 166/285 |
| 5,537,914 A * | 7/1996 | Gibney et al. | 99/323.2 |
| 5,570,743 A * | 11/1996 | Padgett et al. | 166/285 |
| 5,624,182 A * | 4/1997 | Dearing et al. | 366/2 |
| 5,775,803 A * | 7/1998 | Montgomery et al. | 366/2 |
| 6,033,102 A * | 3/2000 | Morihira et al. | 366/8 |
| 6,491,421 B2 * | 12/2002 | Rondeau et al. | 366/8 |
| 6,735,483 B2 * | 5/2004 | Martin et al. | 700/29 |
| 6,786,629 B2 * | 9/2004 | Rondeau et al. | 366/8 |
| 6,979,116 B2 * | 12/2005 | Cecala et al. | 366/132 |
| 7,056,008 B2 * | 6/2006 | Rondeau et al. | 366/8 |
| 7,188,637 B2 * | 3/2007 | Dreyer et al. | 137/6 |
| 7,308,379 B2 * | 12/2007 | Dykstra et al. | 702/127 |
| 7,353,874 B2 * | 4/2008 | Dykstra et al. | 166/305.1 |
| 7,356,427 B2 * | 4/2008 | Dykstra et al. | 702/100 |
| 7,494,263 B2 * | 2/2009 | Dykstra et al. | 366/17 |
| 2003/0161211 A1 * | 8/2003 | Duell et al. | 366/8 |
| 2004/0042335 A1 * | 3/2004 | Cecala et al. | 366/151.1 |
| 2006/0039233 A1 * | 2/2006 | Farrington et al. | 366/8 |
| 2006/0161358 A1 * | 7/2006 | Dykstra et al. | 702/55 |
| 2006/0231259 A1 * | 10/2006 | Dykstra et al. | 166/305.1 |
| 2006/0233039 A1 * | 10/2006 | Dykstra et al. | 366/8 |
| 2007/0153623 A1 * | 7/2007 | Dykstra et al. | 366/8 |
| 2007/0153624 A1 * | 7/2007 | Dykstra et al. | 366/19 |
| 2007/0171765 A1 * | 7/2007 | Dykstra et al. | 366/19 |
| 2008/0084783 A1 * | 4/2008 | Mazrooee et al. | 366/2 |
| 2008/0164023 A1 * | 7/2008 | Dykstra et al. | 166/250.15 |
| 2008/0165613 A1 * | 7/2008 | Dykstra | 366/17 |

FOREIGN PATENT DOCUMENTS

| | | | |
|---|---|---|---|
| GB | 272421 | * | 6/1927 |
| GB | 618985 | * | 3/1949 |
| WO | WO 2006/109035 | | 10/2006 |

OTHER PUBLICATIONS

J T Hatleskog, Thule Rigtech. Mud flow compensation system for floating vessels. Society of Petroleum Engineers paper SPE 26733, 1993.*

Foreign communication related to a counterpart application dated Aug. 16, 2007.

* cited by examiner

METHODS FOR VOLUMETRICALLY CONTROLLING A MIXING APPARATUS

BACKGROUND AND SUMMARY OF THE INVENTIONS

The present invention generally relates to process control, and more particularly to methods of volumetrically controlling a mixing apparatus.

The following paragraphs contain some discussion which is illuminated by the innovations disclosed in this application, and any discussion of actual or proposed or possible approaches in this section does not imply that those approaches are prior art.

The following applications filed concurrently herewith are not necessarily related to the present application, but are incorporated by reference herein in their entirety:

"Methods of Determining a Volumetric Ratio of a Material to the Total Materials in a Mixing Vessel" (U.S. application Ser. No. 11/323,831, filed simultaneously with the effective filing date of the present application)

"Systems for Determining a Volumetric Ratio of a Material to the Total Materials in a Mixing Vessel" (U.S. application Ser. No. 11/323,323, filed simultaneously with the effective filing date of the present application), and "Methods of Volumetrically Controlling a Mixing Apparatus," (U.S. application Ser. No. 11/323,324, filed simultaneously with the effective filing date of the present application).

Control systems are currently being employed to control processes for mixing together multiple components in a mixing vessel. An example of such a process is mixing together dry cement and water to form a cement slurry for use in well cementing. Well cementing is a process in which wells that penetrate subterranean formations are formed in the earth, allowing natural resources such as oil or gas to be recovered from those formations. In well cementing, a wellbore is drilled while a drilling fluid is circulated through the wellbore. The circulation of the drilling fluid is then terminated, and a string of pipe, e.g., casing, is run in the wellbore. Next, primary cementing is typically performed whereby a slurry of cement in water is placed in the annulus, which is located between the exterior of the pipe and the walls of the wellbore. Within the annulus, the cement slurry is allowed to set, i.e., harden into a solid mass, to thereby attach the string of pipe to the walls of the wellbore and seal the annulus. Subsequent secondary cementing operations, i.e., any cementing operation after the primary cementing operation, may also be performed. One example of a secondary cementing operation is squeeze cementing whereby a cement slurry is forced under pressure to areas of lost integrity in the annulus to seal off those areas.

Conventional control systems for such a cement mixing process often attempt to control the output flowrate and output density of the mixture exiting the mixing process by controlling the positions of input valves into the system. In the example in which the input valves are an input water valve and an input cement valve, an output slurry density measurement and a total output flowrate measurement are commonly used to control the process. A Proportional-Integral-Derivative (PID) controller may be used to calculate the commanded input water flowrate based on the total commanded input flowrate and the commanded slurry density. It may also be used to calculate the output water flowrate based on the total measured output flowrate and the measured slurry density. Further, a PID controller may be used to calculate the commanded input cement flowrate based on the commanded total input flowrate and the commanded slurry density. Moreover, it may be used to calculate the output cement flowrate based on the total measured output flowrate and the measured slurry density. However, this type of control system has a major drawback in that the response of the water and cement control loops are time lagged. Thus, a change in the water flowrate usually is not observed and corrected for by the cement control loop for some time and vice versa. As a result, oscillations in the density and flowrate may be experienced, especially during transitional phases such as an input disturbance or a commanded change. Another drawback of this control system is that often no densitometer is available to measure the output slurry density, or the output slurry density is ill-conditioned to be used as a control variable (i.e., the value of the density of one component being mixed is very close to the value of the density of the other component being mixed in a two-component system).

The physical system being controlled (e.g. the mixing process) typically exhibits some nonlinear behavior. Using a PI or a PID control system to overcome the physical system nonlinearity results in eigenvalue migration. That is, the eigenvalues, i.e. the parameters that define the control system, are dependent on the operating conditions such as the flowrate and thus experience relatively large shifts in value as the operating conditions change. Unfortunately, the system is a coupled system in that different portions of the system depend upon each other. Thus, fine tuning the control system is typically impossible to accomplish due to the differing time- or frequency-domain responses of the different portions of the system.

In addition to these limitations, the mixing process often experiences disturbances that can lead to inaccuracies in the measurements of the process. Such disturbances include oscillations in the height of the fluid in the mixing vessel, particularly when the mixing vessel is in motion such as in a ship-based mixing process. Another disturbance commonly encountered is that one material, e.g., the dry cement, may become plugged in the pipe being fed to the mixing vessel such that a significant amount of air is required to force the material into the mixing vessel. As such, the fluid in the mixing vessel may contain unaccounted for air.

A need therefore exists for a control system capable of controlling the output flowrate and composition of a mixing process without needing to control or measure the output density of the process. Further, it is desirable to reduce the lag-time of the control system, allowing the process to be monitored and controlled in real time with more accuracy and precision. It is also desirable that the control system be capable of more robustly accounting for disturbances, nonlinearities, and noise that may occur in the mixing process.

Methods of Volumetrically Controlling a Mixing Apparatus

Some teachings and advantages found in the present application are summarized briefly below. However, note that the present application may disclose multiple embodiments, and not all of the statements in this section necessarily relate to all of those embodiments. Moreover, none of these statements limit the claims in any way.

The estimated volume of a material to total materials in a mixing vessel may be determined using a volumetric ratio observer comprising a feedback loop. The volumetric ratio observer advantageously provides for filtered, zero-lag estimations of the actual volumetric ratios within the mixing vessel in a manner that accounts for unwanted disturbances in the system. By way of example, the materials being combined in the mixing vessel may be dry cement and water, and the slurry formed therein may be pumped down a wellbore during a well cementing process. Knowing the relative volumes inside the mixing vessel at any time and thus the relative volumes of the cement and water being pumped downhole may be very useful.

The volumetric ratio observer may also be employed to estimate the volumetric ratios of the components in two or more mixing vessels in series that are separated by weirs or any other channeling devices that allow fluid to pass from one vessel to the next. The volumetric ratio observer desirably may be used in a control system of such a mixing process where the density of the slurry mixture is unavailable. It may also be employed to control the mixing process even if the densities of the materials being mixed are near the same value such that a densitometer cannot clearly differentiate between them. The volumetric ratio observer allows the mixing process to be controlled volumetrically, providing for tighter control over the relative volumes of the materials in the mixing vessels. As a result, the process may be optimized such that the overall cost of the process is minimized.

Systems for controlling such a mixing process may include multiple volumetric ratio observers (also referred to as volumetric estimators) for estimating the volumes of the respective components in the mixed product and a feedback block for combining at least one physical measurement of the mixed product with the estimators to provide a closed loop system. That is, the respective estimated volumes may be improved by feeding a correction based on one or more physical measurements of the system to the volumetric ratio observers. Examples of physical measurements include measurements of the height, density, total weight, and viscosity of the mixed product.

As described previously, the physical system, i.e., the mixing process, may be affected by nonlinearities. In particular, the feedback of the physical system may be nonlinear, making it difficult to control. To overcome this problem, a virtual system may be simulated in real-time, wherein the virtual system i.e., the system "seen" by the control system, represents the physical dynamics without the nonlinear physical system feedback. The physical system may be controlled with reference to this virtual system by simply using a proportional controller, resulting in more stable eigenvalue behavior than if the physical system were controlled by a PI or PID controller.

The outputs from the control loop employed to control the virtual system may be used to control at least one low-level control loop that controls low-level inputs to the physical system. The low-level inputs may be, for example, the positions of valves through which the respective components flow into the mixing process. In a first process, high-level commanded inputs (e.g., the height of the fluid or the volumetric ratio of one component to total components) may be converted into intermediate commanded targets (e.g., the total input flowrate and the input flowrate of one component). In at least one additional process, those intermediate commanded targets may be converted into the low-level control inputs or settings described above. In various embodiments, a disturbance value is fed back into the first process to decouple nonlinearities. In more embodiments, the desired or measured value of the total flowrate of the mixed product may be fed forward to decouple the effects of the output flow.

DETAILED DESCRIPTION OF THE PREFERRED EMBODIMENTS

Physical System Model

Figure 1:
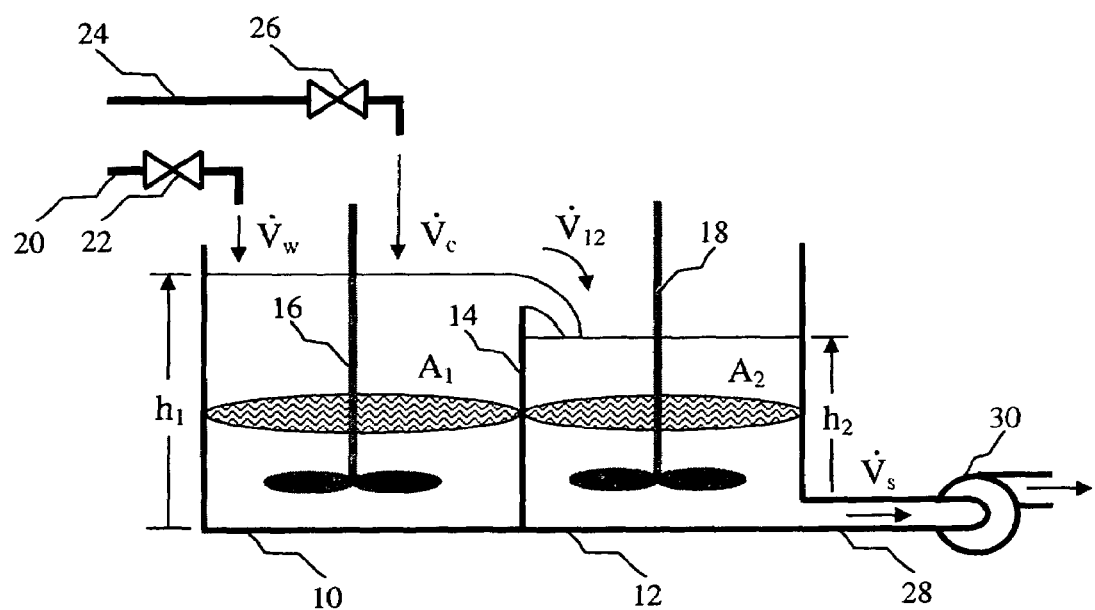
FIG. 1 depicts a mixing apparatus comprising two mixing vessels separated by a weir.

The physical system considered here is a mixing apparatus comprising two mixing vessels 10 and 12, e.g., tanks, separated by a weir 14 as shown in FIG. 1. It is understood that weir 14 may be replaced by other forms of channeling fluid from mixing vessel 10 to mixing vessel 12. As used herein, a "mixing vessel" is defined as a structure that can hold materials as they are being mixed together. Further, a "weir" is defined as a structure that at least partially separates two mixing vessels such that it allows fluid to flow between the two vessels. The mixing process may be carried out through the action of rotating paddles 16 and 18 in respective mixing vessels 10 and 12. Two different materials may be separately added to mixing vessel 10 through pipes 20 and 24. Valves 22 and 26 may be disposed in respective pipes 20 and 24 for controlling the flow of the materials into mixing vessel 10. Within mixing vessel 10, the two materials are mixed together using rotating paddle 16. The mixture formed in mixing vessel 10 may then flow over weir 14 into mixing vessel 12 where the mixing process continues with second rotating paddle 18. The mixture in mixing vessel 12 is finally pumped out of the mixing apparatus through an output pipe 28 in which a pump 30 is disposed. The mixing system depicted in FIG. 1 may reside on the ground, on an oil platform, or on a ship.

In the embodiment depicted in FIG. 1, water and dry cement are the materials being subjected to the mixing process. It is understood that in other embodiments, liquids other than water and dry additives other than cement could be subjected to the mixing process. The volumetric flowrates of the water and the dry cement supplied to mixing vessel 10 are represented in FIG. 1 as $\dot{V}_w$ and $\dot{V}_c$, respectively. The mixing apparatus may be capable of mixing the dry cement and the water to a desired density at a desired volumetric flowrate as required for use in oil well cementing applications. Additional parameters shown in FIG. 1 include the volumetric slurry flowrate $\dot{V}_{12}$ over the weir from mixing vessel 10 to mixing vessel 12, the slurry height $h_1$ in mixing vessel 10, the output slurry rate $\dot{V}_s$ from mixing vessel 12, and the slurry height $h_2$ in mixing vessel 12. In various embodiments of the mixing apparatus, the approximate values for these parameters of the actual physical system are as follows:

- $\dot{V}_s$ ranges from about 1 bbl/min (barrels per minute) to about 15 bbl/min;
- ($\dot{V}_w/\dot{V}_s$) ranges from about 0.3 to about 0.90;
- $h_1$ is approximately 4 ft. as defined by the weir height;
- $h_2$ is approximately controlled to 3.5 ft.;
- $h_1 A_1$ is approximately 220 gallons; and
- $h_2 A_2$ is approximately controlled to 175 gallons.

In alternative embodiments, the mixing apparatus may be designed to run at a $\dot{V}_s$ of up to 100 bbl/min.

The physical system can be modeled mathematically using the law of mass conservation in a control volume, which is represented for mixing vessel 10 by the following equation:

$$\rho_w \dot{V}_w + \rho_c \dot{V}_c - \rho_{12} \dot{V}_{12} + \dot{m}_D = \dot{\rho}_{12} h_1 A_1 + \rho_{12} \dot{h}_1 A_1 \qquad (1)$$

where $\rho_w$ is the density of water, $\rho_c$ is the dry cement density, $\rho_{12}$ is the density of the slurry flowing over the weir, and $A_1$ is the cross-sectional area of mixing vessel 10. The parameter $\dot{m}_D$ represents the sum of all disturbances accounting for unknown mass rate inputs into the system such as the input mass rate of air. The derivation of Equation 1 assumes instantaneous mixing such that any change in the relative proportions of $\dot{V}_w$ and $\dot{V}_c$ is instantaneously realized in the resulting value of the slurry density in mixing vessel 10. With this simplification $\rho_{12}$ now represents the density of all the slurry in mixing vessel 10 at any given moment. The conservation of mass equation for mixing vessel 12 is given as follows:

$$\rho_{12} \dot{V}_{12} - \rho_s \dot{V}_s = \dot{\rho}_s h_2 A_2 + \rho_s \dot{h}_2 A_2 \qquad (2)$$

where $\rho_s$ is the density of the output slurry and $A_2$ is the cross-sectional area of mixing vessel 12. Equation 2 also assumes instantaneous mixing such that $\rho_s$ represents the density of all the slurry in mixing vessel 12 at any given moment.

The physical system can also be modeled mathematically by volume conservation assuming that both the water and the cement added to the system are incompressible. This model is represented for mixing vessel 10 and mixing vessel 12 by the following respective equations:

$$\dot{V}_w + \dot{V}_c - \dot{V}_{12} + \dot{V}_D = \dot{h}_1 A_1 \qquad (3)$$

$$\dot{V}_{12} - \dot{V}_s = \dot{h}_2 A_2 \qquad (4)$$

The parameter $\dot{V}_D$ in Equation 3 represents the "volumetric disturbance flowrate," which is herein defined as the sum of the flowrates of inputs, e.g., air, into the mixing process other than the primary materials being mixed. The term $\dot{V}_{12}$, which represents the volumetric flowrate over the weir, is a non-linear function of the weir shape, fluid rheology and the height of fluid in mixing vessel 10. If the weir shape and the fluid rheology are assumed to be constant, $\dot{V}_{12}$ is predominantly a function of $h_1$ as indicated by the following equation:

$$\dot{V}_{12} = F(h_1) \qquad (5)$$

It is understood that the equations herein could also be applied to other forms of channeling the slurry from one mixing vessel to the next. Thus, Equation 5 could also define the volumetric flow rate through other forms of channeling devices besides a weir.

Figure 2:
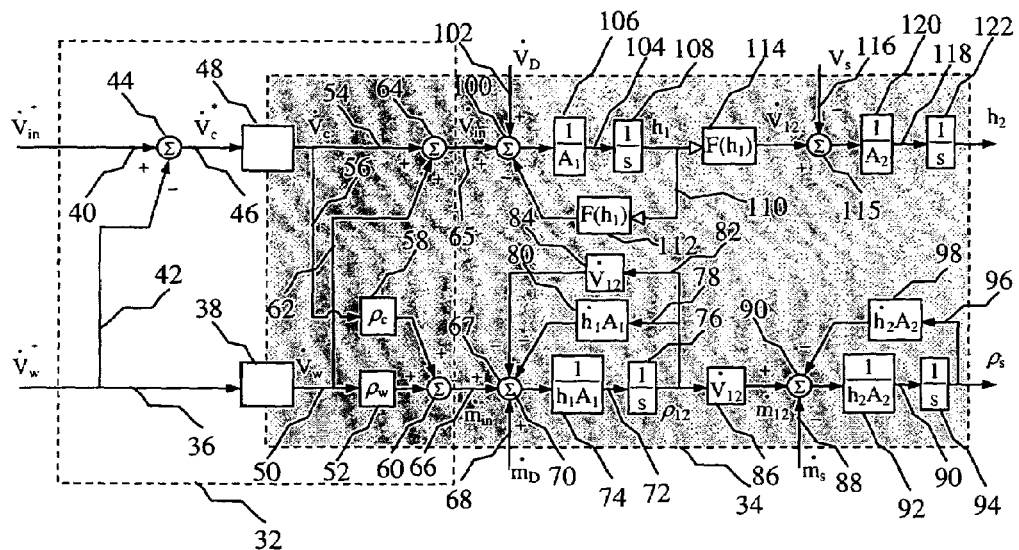
FIG. 2 is a state block diagram of an embodiment of a physical system and a flow modulator being used to volumetrically mix components in the mixing vessels shown in FIG. 1.

FIG. 2 depicts the Laplace frequency domain state block diagram of the physical system 34 modeled by Equations 1 through 5, which will be described in more detail later. The inputs of water and dry cement to the system are shown to come from respective supply lines 36 and 46 that feed a physical water valve 38 and cement valve 48. These valves 38 and 48 are the control point for both slurry density and slurry flowrate through the system. The valves 38 and 48 also represent the boundary between the physical system and the control process.

Flow Modulator

A procedure known as the Flow Modulator 32 is also shown in FIG. 2 that incorporates the following Equations 6 through 13 by modulating from commanded volumetric flowrates to actual volumetric flow and mass rates through water and cement valves 38 and 48. The positions of valves 38 and 48 directly affect the rate of water and dry cement being input into the physical system. The resulting input volumetric rate and input mass rate may be represented by the following equations:

$$\dot{V}_{in} = \dot{V}_w + \dot{V}_c \qquad (6)$$

$$\dot{m}_{in} = \rho_{in} \dot{V}_{in} = \rho_w \dot{V}_w + \rho_c \dot{V}_c \qquad (7)$$

where $\rho_{in}$ is the combined instantaneous density of both input water and dry cement. As can be seen from Equations 6 and 7, the input rates $\dot{V}_w$ and $\dot{V}_c$ are directly coupled with respect to volumetric rate and density of the slurry through the system. Designing separate control algorithms for the water valve and cement valve could produce a system in which $\dot{V}_w$ and $\dot{V}_c$ are competing to control density and flowrate simultaneously, resulting in undesirable behavior. As such, $\dot{V}_{in}$ and $\dot{m}_{in}$ may be chosen as the decoupled control variable. Through these control variables the density and volumetric flowrate can be controlled independently from each other. The desired input volumetric rate $\dot{V}_{in}^*$ and the desired input mass rate $\dot{m}_{in}^*$ can be modeled by the following equations:

$$\dot{m}_{in}^* = \hat{\rho}_w \dot{V}_w^* + \hat{\rho}_c \dot{V}_c^* \qquad (8)$$

$$\dot{V}_{in}^* = \dot{V}_w^* + \dot{V}_c^* \qquad (9)$$

where $\dot{V}_w^*$ and $\dot{V}_c^*$ represent the desired commanded rates of water and dry cement to each valve, respectively. The parameters $\hat{\rho}_w$ and $\hat{\rho}_c$ represent the predetermined estimated values of water density and dry cement density. Rearranging Equations 7 and 8 the commanded rates to the valves can be represented as follows:

$$\dot{V}_w^* = \left(\frac{1}{\hat{\rho}_c - \hat{\rho}_w}\right)\left[\hat{\rho}_c \dot{V}_{in}^* - \dot{m}_{in}^*\right] \qquad (10)$$

$$\dot{V}_c^* = \left(\frac{1}{\hat{\rho}_c - \hat{\rho}_w}\right)\left[\dot{m}_{in}^* - \hat{\rho}_w \dot{V}_{in}^*\right] \qquad (11)$$

In order to verify that $\dot{V}_{in}$ and $\dot{m}_{in}$ are actually decoupled, the output rate of each valve is assumed to closely approximate the commanded input rate to each valve as follows:

$$\dot{V}_w \approx \dot{V}_w^* \qquad (12)$$

$$\dot{V}_c \approx \dot{V}_c^* \qquad (13)$$

Combining Equations 6 through 13 results in the following set of equations:

$$\dot{V}_{in} = \dot{V}_{in}^* \tag{14}$$

$$\dot{m}_{in} = \left(\frac{\rho_c - \rho_w}{\hat{\rho}_c - \hat{\rho}_w}\right)\dot{m}_{in}^* + \left(\frac{\rho_w\hat{\rho}_c - \rho_c\hat{\rho}_w}{\hat{\rho}_c - \hat{\rho}_w}\right)\dot{V}_{in}^* \tag{15}$$

Equations 14 and 15 verify that the volumetric input rate is completely independent of the mass input rate. Additionally, if $\hat{\rho}_c \cong \rho_c$ and $\hat{\rho}_w \cong \rho_w$, then Equation 15 reduces to $$\dot{m}_{in} \cong \dot{m}_{in}^* \tag{16}$$

and the mass input rate becomes independent of the volumetric input flowrate. If the density estimations are incorrect or the valve delivery is not approximated exactly as assumed in Equations 12 and 13, these "errors" may be absorbed into the modeled disturbance terms $\dot{V}_D$ and $\dot{m}_D$.

The density of the slurry mixture may be unavailable due to a lack of a density measuring device or to the density values of the dry cement and water being very similar (i.e., $\rho_w \cong \rho_c$) such that density is a poorly conditioned variable for good control. A mixing system in which the input water rate $\dot{V}_w$ into the first mixing vessel, the fluid height $h_2$ in the second mixing vessel, and the output slurry rate $\dot{V}_s$ from the second mixing vessel are available for measurement may be controlled using a so-called volumetric ratio mixing control approach. That is, the mixing process may be controlled volumetrically, and the chosen control variables may be the overall total flowrate of the slurry through the system and the percentage or ratio of the slurry which is water.

In an embodiment in which the density is no longer the variable by which the water and the cement are proportioned, $\hat{\rho}_w$ may be set equal to 1 ($\hat{\rho}_w$=1) and $\hat{\rho}_c$ may be set equal to 0 ($\hat{\rho}_c$=0). Turning back to FIG. 2, the inputs to physical system 34 now become the overall commanded input rate $\dot{V}_{in}^*$ and the commanded input water rate $\dot{V}_w^*$ into the first mixing vessel. The Flow Modulator 32 may send $\dot{V}_w^*$ directly to water valve 38 via signal 36. Further, it may send the overall commanded input rate $\dot{V}_{in}^*$ via signal 40 and the commanded input water rate $\dot{V}_w^*$ via signal 42 to a comparator 44 where $\dot{V}_w^*$ is subtracted from $\dot{V}_{in}^*$ to obtain the commanded input cement rate $\dot{V}_c^*$, which may then be sent to cement valve 48 via signal 46. The positions of valves 38 and 48 may be set according to those commanded input rates.

The resulting water flowrate $\dot{V}_w$ exiting water valve 38 and the resulting cement flowrate $\dot{V}_c$ exiting cement valve 48 may be measured. The total input mass flowrate $\dot{m}_{in}$ to the mixing process is the result of the summation (summation block 60) of the water mass flow rate $\dot{V}_w$ (signal 50) multiplied by $\rho_w$ (gain element 52) and the cement mass flow rate $\dot{V}_c$ (signal 56) multiplied by $\rho_c$ (gain element 58) as described in Equation 7.

Next, $\dot{m}_{in}$ may be sent to another summation block 67 to which the mass disturbance flowrate $\dot{m}_D$, the total mass flowrate out of the first mixing vessel, and the total mass flowrate within the first mixing vessel also may be sent. At summation block 67, the total mass flowrate out of the first mixing vessel and the total mass flowrate within the first mixing vessel may be subtracted from the sum of $\dot{m}_{in}$ and $\dot{m}_D$ to obtain the total mass rate of change in the first mixing vessel. The total mass rate of change may then be sent via signal 72 to an Integral controller comprising gain element 74 for multiplying the total mass rate of change by $1/h_1A_1$ to obtain the total density rate of change in the first mixing vessel. The Integral controller also comprises an integral element 76 for multiplying the total density rate of change by 1/s, which is the laplace transform representation of integration, to determine the density of the mixture flowing over the weir, $\rho_{12}$. The Integral controller may then feed $\rho_{12}$ back to summation block 67 via signals 78 and 82. On its way to summation block 67, signal 78 may pass through gain element 80 where it is multiplied by $h_1A_1$ to obtain the total mass flowrate in the first mixing vessel. Also, signal 80 may pass through gain element 84 where it is multiplied by $\dot{V}_{12}$ to obtain the total mass flowrate out of the first mixing vessel, i.e., over the weir. In this manner, the Integral controller may dynamically recompute $\rho_{12}$. After being sent to integral element 76, signal 72 further may be sent to gain element 86 where it is multiplied by the total output volumetric flowrate from the first mixing vessel $\dot{V}_{12}$ to obtain the total mass flowrate $\dot{m}_{12}$ before being sent to yet another summation block 90.

At summation block 90, the total mass flowrate in the second mixing vessel, indicated by signal 96, and the total mass flowrate out of the second mixing vessel (a measured value), indicated by signal 88, may be subtracted from the $\dot{m}_{12}$ to obtain the total mass rate of change in the second mixing vessel. The total mass rate of change may then be sent via signal 90 to an Integral controller comprising gain element 92 for multiplying the total mass rate of change by $1/h_2A_2$ to obtain the total density rate of change in the first mixing vessel. The Integral controller also comprises an integral element 94 for determining the density of the slurry flowing out of the second mixing vessel, $\rho_s$. The Integral controller may then feed $\rho_s$ back to summation block 90 via signal 96. On its way to summation block 67, signal 96 may pass through gain element 98 where it is multiplied by $h_2A_2$ to obtain the total mass flowrate in the second mixing vessel. In this manner, the Integral controller may dynamically recompute $\rho_s$.

As further shown in FIG. 2, the cement flowrate $\dot{V}_c$ exiting cement valve 48 and the water flowrate $\dot{V}_w$ exiting water valve 38 may be sent via signals 54 and 62, respectively, to a summation block 64 to obtain the total volumetric input flowrate $\dot{V}_{in}$. Then $\dot{V}_{in}$ and a total volumetric disturbance flowrate $\dot{V}_D$ may be sent to summation block 100 via signals 65 and 102, respectively. The volumetric flowrate within the first mixing vessel may also be fed back to summation block 100 where it is subtracted from the sum of $\dot{V}_{in}$ and $\dot{V}_D$ to obtain the total volumetric rate of change in the first mixing vessel. The volumetric mass rate of change may then be sent via signal 104 to an Integral controller comprising gain element 106 for multiplying the total volumetric rate of change by $1/A_1$ to obtain the total height rate of change in the first mixing vessel. The Integral controller also comprises an integral element 108 for determining the height of the mixture in the second mixing vessel, $h_1$. The Integral controller may then feed $h_1$ back to summation block 100 via signal 110. On its way to summation block 100, signal 110 may pass through gain element 112 where it is multiplied by $F(h_1)$ to obtain the total volumetric flowrate out of the first mixing vessel $\dot{V}_{12}$. In this manner, the Integral controller may dynamically recompute $h_1$.

Additionally, signal 104 may be sent to a gain element 114 for multiplying $h_1$ by $F(h_1)$ to determine $\dot{V}_{12}$ before it is sent to yet another summation block 115. The total flowrate of the slurry exiting the second mixing vessel, $\dot{V}_s$, is also sent via signal 116 to summation block 115 where it is subtracted from $\dot{V}_{12}$ to obtain the total volumetric rate of change in the second mixing vessel. The output of summation block 115 is further sent to gain elements 120 and 122 for multiplying the total volumetric rate of change by $1/A_2$ and $1/s$, respectively, to thereby determine the height of the slurry in the second mixing vessel, $h_2$.

Volumetric Ratio Observer

The volumetric ratio of one material relative to the total materials in one of the mixing vessels may be determined using a Volumetric Ratio Observer. This observer is based on the same physical dynamics described above and may be derived in a way that does not include density parameters. That is, a single mixing vessel with N number of components being mixed together therein can be modeled using the law of mass conservation by the following equation:

$$\rho_1(\dot{V}_{in})_1 + \rho_2(\dot{V}_{in})_2 + \ldots + \rho_N(\dot{V}_{in})_N - \rho_{out}\dot{V}_{out} + \dot{m}_D = \rho_{out}\dot{V}_T + \rho_{out}\dot{V}_T \quad (17)$$

where $\rho_N$ is the density of the Nth component being mixed, $(\dot{V}_{in})_N$ is the volumetric flowrate at which the Nth component is being added to the mixing vessel, $\rho_{out}$ is the density of the mixture flowing out of the mixing vessel, $\dot{V}_{out}$ is the output flowrate of the mixture from the mixing vessel, and $V_T$ is the volume of the mixture currently in the mixing vessel. The parameter $\dot{m}_D$ represents the sum of all disturbances accounting for unknown mass rate inputs into the system and is given as follows:

$$\dot{m}_D = \rho_1(\dot{V}_D)_1 + \rho_2(\dot{V}_D)_2 + \ldots + \rho_N(\dot{V}_D)_N \quad (18)$$

where $(\dot{V}_D)_N$ represents the unknown volumetric flowrate disturbance of the Nth component. The total volumetric flowrate disturbance $\dot{V}_D$ is given as the sum of all the component disturbances as follows:

$$\dot{V}_D = (\dot{V}_D)_1 + (\dot{V}_D)_2 + \ldots + (\dot{V}_D)_N \quad (19)$$

Using instantaneous mixing as described before, the density $\rho_{out}$ may be represented by the following equation:

$$\rho_{out} = \left(\frac{\rho_1(V_T)_1 + \rho_2(V_T)_2 + \ldots + \rho_N(V_T)_N}{(V_T)_1 + (V_T)_2 + \ldots + (V_T)_N}\right) \quad (20)$$

where $(V_T)_N$ represents the volume of the Nth component currently in the mixing vessel. The total volume of the mixture in the mixing vessel $V_T$ may be represented by the following equation:

$$V_T = (V_T)_1 + (V_T)_2 + \ldots + (V_T)_N \quad (21)$$

Eliminating $\rho_{out}$ from Equations 17 through 21 and grouping terms with common density coefficients, the resulting volumetric equations describing the separate component flow through the mixing vessel are given as follows:

$$\begin{aligned}(\dot{V}_{in})_1 - \left(\frac{(V_T)_1}{V_T}\right)\dot{V}_{out} + (\dot{V}_D)_1 &= (\dot{V}_T)_1 \\ (\dot{V}_{in})_2 - \left(\frac{(V_T)_2}{V_T}\right)\dot{V}_{out} + (\dot{V}_D)_2 &= (\dot{V}_T)_2 \\ &\vdots \\ (\dot{V}_{in})_N - \left(\frac{(V_T)_N}{V_T}\right)\dot{V}_{out} + (\dot{V}_D)_N &= (\dot{V}_T)_N \end{aligned} \quad (22)$$

Here the volumetric ratio of the Nth component with respect to the overall volume of the mixture is given as $$(R_{out})_N = \left(\frac{(V_T)_N}{V_T}\right) \quad (23)$$

where the notation $(R_{out})_N$ incorporates the instantaneous mixing assumption, indicating not only the volumetric ratio of the Nth component to the total materials in the mixing vessel but also the volumetric flowrate ratio of the Nth component to the total output flowrate $\dot{V}_{out}$. Combining Equations 21 and 23 gives the relationship between all the component volumetric ratios as follows:

$$(R_{out})_1 + (R_{out})_2 + \ldots + (R_{out})_N = 1 \quad (24)$$

Figure 3A:
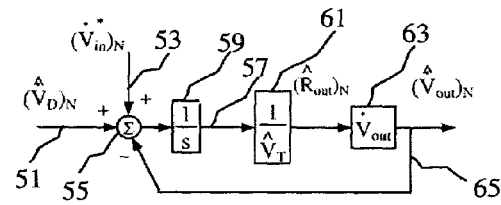
FIG. 3A is a state block diagram of an embodiment of a portion of a volumetric ratio observer for use with a single mixing vessel.
Figure 3B:
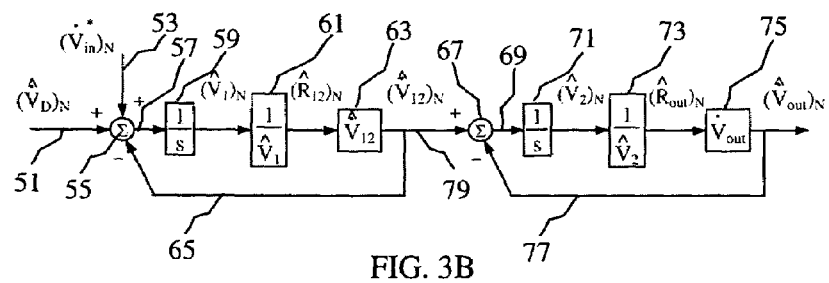
FIG. 3B is a state block diagram of another embodiment of a portion of a volumetric ratio observer for use with two mixing vessels.

The state block diagrams of the primary components of Volumetric Ratio Observers (VRO's) for a single mixing vessel and for two mixing vessels are shown in FIG. 3A and FIG. 3B, respectively. Using the same notation from earlier, the symbol (^) indicates that a parameter has been estimated. The commanded or setpoint inputs for the VRO's represent the commanded rates to the actual physical system and are signified by the symbol (*). The VRO may be implemented using various arrangements of closed loops, as will be detailed later in particular embodiments of the Volumetric Mixing Control approach. The VRO may serve to decouple the effects of disturbances on the system.

As shown in FIG. 3A, the VRO for the Nth component being fed to a single mixing vessel may include a summation block 55 for subtracting an estimated output flowrate of the Nth component $(\hat{\dot{V}}_{out})_N$ from the sum of a volumetric disturbance flowrate of the Nth component, $(\hat{\dot{V}}_D)_N$, and a commanded input flowrate of the Nth component $(\dot{V}_{in}^*)_N$. The $(\hat{\dot{V}}_{out})_N$ may be fed to summation block 55 via signal 65, the $(\hat{\dot{V}}_D)_N$ may be fed to summation block 55 via signal 51, and the $(\dot{V}_{in}^*)_N$ may be fed to summation block 55 via signal 53. The output of summation block 55, as indicated by signal 57, may represent an estimated volumetric rate of change of the Nth component in the mixing vessel. The estimated volumetric rate of change of the Nth component may be fed to an Integral controller comprising an integral element 59 for computing the estimated volume of the Nth component in the mixing vessel. The Integral controller may also include a gain element 61 for multiplying the estimated volume of the Nth component in the mixing vessel by 1/(the estimated volume of the total materials in the mixing vessel) to obtain the estimated output ratio of the Nth component to the total materials in the mixing vessel, $(\hat{R}_{out})_N$. It may further include gain element 63 for multiplying $(\hat{R}_{out})_N$ by the total estimated output flowrate from the mixing vessel, $\hat{\dot{V}}_{out}$, to estimate the output flowrate of the Nth component $(\hat{\dot{V}}_{out})_N$, which may be negatively fed back to summation block 55. Thus, the Integral controller dynamically recomputes $(\hat{\dot{V}}_{out})_N$.

As illustrated in FIG. 3B, the Volumetric Ratio Observer may be expanded to cover two mixing vessels. In this embodiment, the term $(\hat{\dot{V}}_{12})_N$ is the estimated flowrate of the Nth component out of the first mixing vessel and into the second mixing vessel. The total estimated flowrate between the two mixing vessels, i.e., over the weir, may be represented by $$\hat{\dot{V}}_{12} = (\hat{\dot{V}}_{12})_1 + (\hat{\dot{V}}_{12})_2 + \ldots + (\hat{\dot{V}}_{12})_N \quad (25)$$

The volumes of the mixture in the first mixing vessel and the second mixing vessel are given by $\hat{V}_1$ and $\hat{V}_2$, respectively. The portion of the state block diagram depicted in FIG. 3B that dynamically recomputes $(\hat{\dot{V}}_{12})_N$ using a first Integral controller is the same as the state block diagram shown in FIG. 3A with the exception that gain element 61 multiplies by $1/\hat{V}_1$ and gain element 63 multiplies by $\hat{V}_{12}$. The $(\hat{V}_{12})_N$ computed by the first Integral controller may be sent to a summation block 67 via signal 79 where an estimated value of the output flowrate $(\hat{V}_{out})_N$ from the second mixing vessel is subtracted from $(\hat{V}_{12})_N$ to obtain the volumetric rate of change in the second mixing vessel. This volumetric rate of change is then sent to a second Integral controller via signal 69. The second Integral controller comprises an integral element 71 for determining the total volume of the Nth component in the second mixing vessel, $(\hat{V}_2)_N$. It also comprises gain element 73 for multiplying $(\hat{V}_2)_N$ by $1/\hat{V}_2$ to determine $(\hat{R}_{out})_N$ and gain element 75 for multiplying $(\hat{R}_{out})_N$ by $\dot{V}_{out}$, thereby determining the estimated output flowrate of the Nth component from the second mixing vessel, $(\hat{V}_{out})_N$. The $(\hat{V}_{out})_N$ may then be negatively fed back to summation block 67 via signal 77 such that it may be dynamically recomputed. It is understood that the VRO is not limited to one or two mixing vessels but may be used for any number of mixing vessels by the addition of an Integral controller for each additional mixing vessel. Further, control schemes like those shown in FIGS. 3A and 3B may be implemented for any component being mixed in the one or more mixing vessels. There is no limit to the number of components that may be mixed together using the control system described herein.

Cement Mixing Control Scheme

Figure 4:
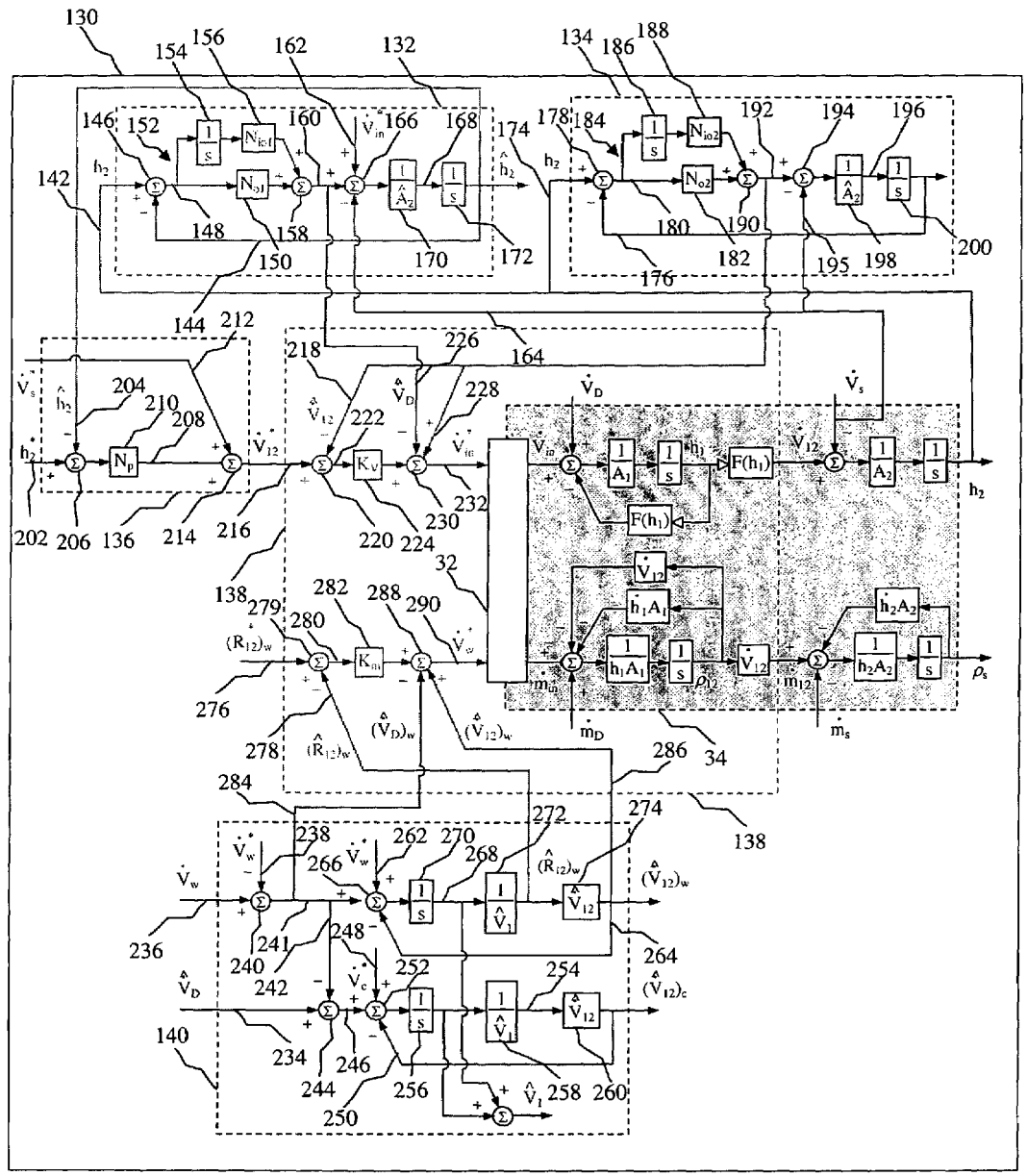
FIG. 4 is a state block diagram of an embodiment of a control system for controlling the mixing apparatus depicted in FIG. 1.

FIG. 4 illustrates one embodiment of the volumetric ratio mixing control scheme mentioned earlier. The process being controlled comprises mixing cement and water together in a mixing apparatus containing two mixing vessels separated by a weir as shown in FIG. 1. FIG. 4 depicts a control system 130 that includes two Height Observers 132 and 134, a State Feedback Controller 136, a Flow Regulator 138, and a Volumetric Ratio Observer 140. The Flow Modulator 32 and the state block diagram of the physical system 34 that are depicted in FIG. 2 are also shown in FIG. 4. A detailed description of these parts of the control scheme may be found in the previous discussion of FIG. 2.

The first Height Observer 132 depicted in FIG. 4 takes as input the measured height $h_2$ of fluid in the second mixing vessel, the measured output flowrate of the slurry $\dot{V}_s$ exiting the second mixing vessel, and the overall commanded volumetric input flowrate $\dot{V}_{in}^*$. This Height Observer 132 then estimates the fluid height in the second mixing vessel, which is used as feedback in State. Feedback Controller 136. It further estimates the overall volumetric disturbance flowrate $\hat{V}_D$, which is used for disturbance input decoupling in Flow Regulator 138. The second Height Observer 134 depicted in FIG. 4, also known as the Weir Flow Observer, takes as input $h_2$ and $\dot{V}_s$. With only these two inputs, Height Observer 134 estimates the flowrate of the fluid $\hat{V}_{12}$ flowing over the weir from the first mixing vessel to the second mixing vessel.

Describing Height Observer 132 in more detail, $h_2$ may be fed from physical system 34 to a summation block 146 via signal 142. The estimated height of the fluid $\hat{h}_2$ in the second mixing vessel may also be sent via signal 144 to summation block 146 where it is subtracted from $h_2$ to determine an estimation of a height error for the second mixing vessel. This estimation of height error may then be fed via signal 148 to a Proportional-Integral controller 152 comprising an integral element 154, an integral gain element 156 for multiplying it by a constant $N_{io1}$, and a proportional gain element 150 for multiplying it by a constant $N_{o1}$. The PI gains may be set to remove the noise and oscillations of the second mixing vessel from the height estimation. The output of integral gain element 156 and of proportional gain element 150 may then be summed at a summation block 158 to estimate the total volumetric disturbance flowrate $\hat{V}_D$. The $\hat{V}_D$ may be sent via signal 160 to another summation block 166. In addition, both the $\dot{V}_{in}^*$ and the $\dot{V}_s$ as measured by a sensor may be fed to summation block 166 via signals 162 and 164, respectively. At summation block 166, the $\dot{V}_s$ may be subtracted from the sum of $\dot{V}_{in}^*$ and $\hat{V}_D$ to obtain the volumetric rate of change in the second mixing vessel. The output of summation block 166 may be sent to an Integral controller comprising a multiplier block gain element 170 where it is multiplied by 1/(the estimated cross-sectional area of the second mixing vessel) to convert the volumetric rate of change to the rate of height change in the second mixing vessel. This rate of height change may be sent to an integral element 172 to compute $\hat{h}_2$. The Height Observer 132 may continue to dynamically recompute $\hat{h}_2$ in this manner.

As shown in FIG. 4, the Weir Flow Observer 134 may be very similar to the Height Observer 132. That is, it may also include a summation block 178 to which $h_2$ is fed via signal 142 and $\hat{h}_2$ is negatively fed via signal 176. The output of summation block 178, i.e., an estimation of a height error for the second mixing vessel, may then be fed via signal 148 to a Proportional-Integral controller 184 comprising an integral element 186, an integral gain element 188 for multiplying it by a constant $N_{io2}$, and a proportional gain element 182 for multiplying it by a constant $N_{o2}$. The output of integral gain element 188 and of proportional gain element 182 may then be summed at a summation block 190 to estimate the total output flowrate $\hat{V}_{12}$ from the first mixing vessel. The $\hat{V}_{12}$ may then be sent via signal 192 to another summation block 194 to which the $\dot{V}_s$ may also be sent via signal 195. At summation block 166, the $\dot{V}_s$ may be subtracted from the $\hat{V}_{12}$ to obtain the volumetric rate of change in the second mixing vessel. The output of summation block 194 may be sent to an Integral controller comprising a gain element 198 where it is multiplied by 1/(the estimated cross-sectional area of the second mixing vessel) to convert the volumetric rate of change to the rate of height change in the second mixing vessel. This rate of height change may be sent to an integral element 200 to compute $\hat{h}_2$. The Height Observer 134 may continue to dynamically recompute $\hat{h}_2$ in this manner. Additional information related to height observers may be found in U.S. patent application Ser. No. 11/029,072, entitled "Methods And Systems for Estimating a Nominal Height or Quantity of a Fluid in a Mixing Tank While Reducing Noise," filed on Jan. 4, 2005, which is incorporated by reference herein in its entirety.

In order to maintain enough fluid in the physical system to supply a desired output flowrate of the slurry $\dot{V}_s^*$ from the second mixing vessel, a State Feedback Controller 136 may be implemented where $\hat{h}_2$ is the state feedback. In particular, the $\hat{h}_2$ determined by Height Observer 132 may be sent via signal 204 to a summation block 206 where it is subtracted from the commanded height of the fluid $h_2^*$ in the second mixing vessel, indicated by signal 202, to estimate the height error for the second mixing vessel. The output of summation block 206 may be sent to a proportional gain element 210 via signal 216 where it is multiplied by the constant $N_p$ before being summed with $\dot{V}_s^*$ at summation block 214. In this manner, State Feedback Controller 136 computes a commanded output flowrate $\dot{V}_{12}^*$ of the total materials from the first mixing vessel. This desired output flowrate is then sent through Flow Regulator 138 and Flow Modulator 32 to adjust the water and cement valves as needed.

This implementation of Height Observer 132 and Weir Flow Observer 134 with full state feedback allows control system 130 to be fully enhanced. These height observers not only provide filtered, zero-lag estimations of the actual signals but also provide for disturbance estimation.

The estimated output flowrate $\hat{\dot{V}}_{12}$ from the first mixing vessel determined by Weir Flow Observer 134 may be fed back to an upper portion of Flow Regulator 138 to "cancel" or decouple the negative state feedback that naturally occurs in the physical system. The estimated total volumetric disturbance flowrate $\hat{\dot{V}}_D$ determined by Height Observer 132 results from input air and errors between commanded volumetric rates and actual volumetric rates through the valves. This volumetric disturbance flowrate estimation may be negatively fed back to Flow Regulator 138 to decouple the effect of the disturbance in the system, thereby making the control system invariant to unmeasured volumetric flowrate disturbances.

Describing Flow Regulator 138 in more detail, $\hat{\dot{V}}_{12}$ may be fed back to summation block 220 where it is subtracted from $\dot{V}_{12}^*$, which is fed to summation block 220 via signal 216. The output of summation block 220 may then be sent to a proportional gain element 224 where it may be multiplied by a constant $K_v$ before being sent to another summation block 230. The $\hat{\dot{V}}_D$ may be fed back to summation block 230 via signal 226, and $\hat{\dot{V}}_{12}$ may also be fed to summation block 230 via signal 228 such that $\hat{\dot{V}}_D$ is subtracted from the sum of the output of gain element 224 and $\hat{\dot{V}}_{12}$. The output of summation block 230 is the total commanded input flowrate $\dot{V}_{in}^*$ to the mixing process, which may be fed to Flow Modulator 32 via signal 232. As described previously, Flow Modulator 32 may modulate from the commanded flowrate $\dot{V}_{in}^*$ to the actual input flowrate $\dot{V}_{in}$.

The Volumetric Ratio Observer 140 shown in FIG. 4 may be implemented to estimate the ratio of water to total materials in the first mixing vessel in accordance with the following equation:

$$(\hat{R}_{12})_w = \left(\frac{(\hat{V}_1)_w}{\hat{V}_1}\right) \quad (26)$$

The inputs to Volumetric Ratio Observer 140 may include the commanded input water rate $\dot{V}_w^*$ and the measured input water rate $\dot{V}_w$ as well as the closed loop estimate of the volumetric disturbance $\hat{\dot{V}}_D$ from Height Observer 132. The measured and commanded input water rates may be used to estimate the input disturbance flowrate $(\hat{\dot{V}}_D)_w$ in the water delivery. This disturbance may be used for disturbance input decoupling within Flow Regulator 138 and to determine the input disturbance flowrate $(\hat{\dot{V}}_D)_c$ in the cement delivery within Volumetric Ratio Observer 140.

In the embodiment of Volumetric Ratio Observer 140 shown in FIG. 4, a summation block 240 is employed to determine the estimated volumetric disturbance flowrate of the water $(\hat{\dot{V}}_D)_w$ by comparing $\dot{V}_w$ to $\dot{V}_w^*$, which are fed to summation block 240 via signals 236 and 238, respectively. The $(\hat{\dot{V}}_D)_w$ may then be fed to a summation block 266 to which $\dot{V}_w^*$ is also fed via signal 262. Further, an estimated output flowrate of the water $(\hat{\dot{V}}_{12})_w$ from the first mixing vessel may be negatively fed to summation block 266. At summation block 266, the $(\hat{\dot{V}}_{12})_w$ may be subtracted from the summation of $(\hat{\dot{V}}_D)_w$ and $\dot{V}_w^*$ to determine an estimated volumetric rate of change of the water in the first mixing vessel.

The output of summation block 266 may be fed via signal 268 to an Integral controller comprising an Integral element 270 and a gain element 272 for multiplying it by $1/\hat{V}_1$, thereby determining the estimated volumetric ratio $(\hat{R}_{12})_w$ of the water to the total materials in the first mixing vessel. The Integral Controller further comprises another gain element 274 for multiplying $(\hat{R}_{12})_w$ by the total estimated output flowrate $\hat{\dot{V}}_{12}$ from the first mixing vessel to estimate the output flowrate of the water $(\hat{\dot{V}}_{12})_w$ from the first mixing vessel. This estimated output flowrate of the water $(\hat{\dot{V}}_{12})_w$ may then be fed back to summation block 266 via signal 264. The Integral controller continues to dynamically recompute the estimated rate $(\hat{\dot{V}}_{12})_w$ in this manner.

The Volumetric Ratio Observer 140 may also determine the volumetric disturbance flowrate of the cement $(\hat{\dot{V}}_D)_c$ through the use of another summation block 244 for subtracting the volumetric disturbance flowrate of the water $(\hat{\dot{V}}_D)_w$ from the total input volumetric disturbance flowrate $\hat{\dot{V}}_D$ determined by Height Observer 132. The $(\hat{\dot{V}}_D)_w$ may be fed from the output of summation block 240 to summation block 244 via signal 242, and the $\hat{\dot{V}}_D$ may be fed to summation block 234 via signal 234. The volumetric disturbance flowrate of the cement $(\hat{\dot{V}}_D)_c$ may then be sent to yet another summation block 252 via signal 246. Further, a commanded input cement flowrate $\dot{V}_c^*$ and an estimated output flowrate of the cement $(\hat{\dot{V}}_{12})_c$ from the first mixing vessel may be fed to summation block 252 via signals 248 and 250, respectively. At summation block 252, the $(\hat{\dot{V}}_{12})_c$ may be subtracted from the summation of $(\hat{\dot{V}}_D)_c$ and $\dot{V}_c^*$ to determine an estimated volumetric rate of change of the cement in the first mixing vessel. The output of summation block 252 may be fed via signal 254 to an Integral controller comprising an integral element 256, a gain element 258 for multiplying it by $1/\hat{V}_1$, and another gain element 260 for multiplying it by the total estimated output flowrate $\hat{\dot{V}}_{12}$ from the first mixing vessel. As a result, the estimated volumetric rate of change of the cement in the first mixing vessel may be converted to the estimated output flowrate of the cement $(\hat{\dot{V}}_{12})_c$ from the first mixing vessel. This estimated output flowrate of the cement $(\hat{\dot{V}}_{12})_c$ may then be fed back to summation block 252 via signal 250. The Integral controller continues to dynamically recompute the estimated rate $(\hat{\dot{V}}_{12})_c$ in this manner.

The estimated water ratio $(\hat{R}_{12})_w$ in the first mixing vessel may be fed back and compared to the desired water ratio $(R_{12}^*)_w$ in a Proportional controller within a lower portion of Flow Regulator 138. That is, the $(\hat{R}_{12})_w$ may be fed via signal 278 from Volumetric Ratio Observer 140 to a summation block 279 of Flow Regulator. Further, the $(R_{12}^*)_w$ may be fed via signal 276 to summation block 279. The output of summation block 279 may then be fed via signal 280 to a proportional gain element 282 for multiplying it by $K_m$ before being sent to a summation block 288 of Flow Regulator 138. The estimated output flowrate of the water $(\hat{\dot{V}}_{12})_w$ exiting the first mixing vessel also may be fed back to the Flow Regulator for decoupling purposes. That is, the $(\hat{\dot{V}}_{12})_w$ may be fed via signal 286 to summation block 288. Further, the estimated volumetric disturbance flowrate of the water $(\hat{\dot{V}}_D)_w$ may be fed to summation block 288. At summation block 288, the $(\hat{\dot{V}}_D)_w$ may be subtracted from the summation of the output of gain element 282 and $(\hat{\dot{V}}_{12})_w$, thereby computing the commanded input flowrate of the water $\dot{V}_w^*$. The $\dot{V}_w^*$ may be fed to Flow Modulator 32 via signal 290. As described previously, Flow Modulator 32 may modulate from the total commanded input volumetric flowrate $\dot{V}_{in}^*$ and the commanded input volumetric flow rate of the water $\dot{V}_w^*$ to the actual total input mass flowrate $\dot{m}_{in}$. (See FIG. 2).

The foregoing implementation Volumetric Ratio Observer 140 with state feedback allows control system 130 to be fully enhanced. The VRO provides for filtered, zero-lag estimations of actual signals.

Figure 5:
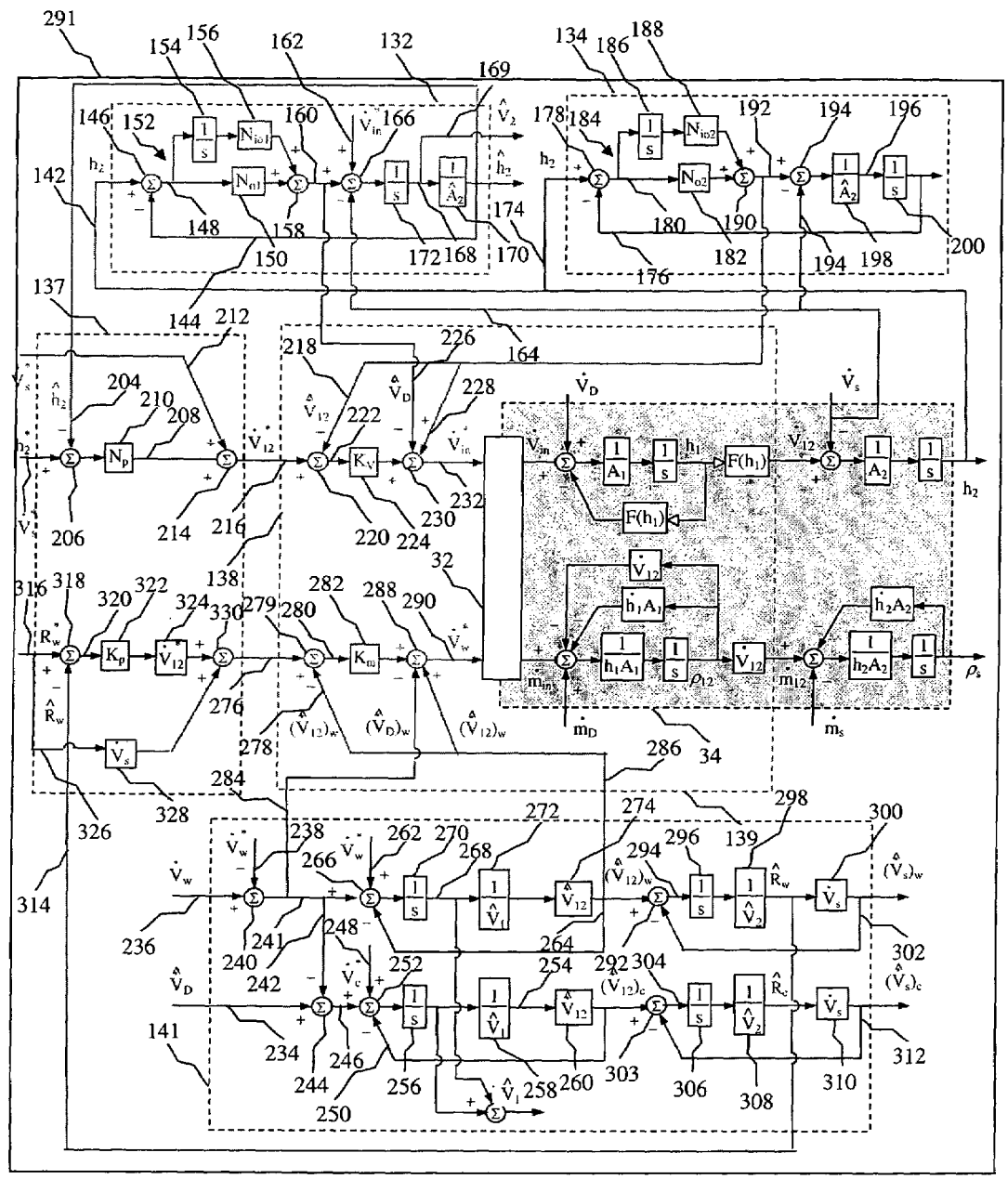
FIG. 5 is a state block diagram of another embodiment of a control system for controlling the mixing apparatus depicted in FIG. 1.

FIG. 5 illustrates another embodiment of the volumetric ratio mixing control scheme in which the process being controlled comprises mixing cement and water together in a mixing apparatus containing two mixing vessels separated by a weir as shown in FIG. 1. FIG. 5 depicts a control system 291 that is the same as control system 130 of FIG. 4 except for some changes in the Volumetric Ratio Observer, the State Feedback Controller, and the Flow Regulator. In particular, this embodiment extends the VRO in FIG. 4 from a one vessel implementation to a two vessel implementation for estimating the ratio of water to total materials in the second mixing vessel rather than the first mixing vessel. This embodiment also provides for water ratio control within the State Feedback Controller.

The differences of FIG. 5 are described in more detail below, beginning with Volumetric Ratio Observer 141. In particular, the estimated output flowrate of the water $(\hat{\dot{V}}_{12})_w$ from the first mixing vessel may be further passed to another summation block 292. At summation block 292, an estimated output flowrate of the water $(\hat{\dot{V}}_s)_w$ from the second mixing vessel may be subtracted from $(\hat{\dot{V}}_{12})_w$ to determine the volumetric rate of change in the second mixing vessel. The output of summation block 292 may then be sent via signal 294 to an Integral controller comprising an integral element 296 and a gain element 298 for multiplying it by $1/\hat{V}_2$ to determine the estimated volumetric ratio of the water to total materials $\hat{R}_w$ in the second mixing vessel. The Integral controller may further include a gain element 300 for multiplying $\hat{R}_w$ by the total output flowrate $\dot{V}_s$ from the second mixing vessel, which may be measured, to determine the estimated total output flowrate $(\hat{\dot{V}}_s)_w$ of the water. The $(\hat{\dot{V}}_s)_w$ may be fed back to summation block 292 via signal 302, allowing it to be dynamically recomputed.

Another difference between Volumetric Ratio Observer 141 and Volumetric Ratio Observer 140 is that the estimated output flowrate of the cement $(\hat{\dot{V}}_{12})_c$ from the second mixing vessel may be further passed to another summation block 303. At summation block 303, an estimated output flowrate of the cement $(\hat{\dot{V}}_s)_c$ from the second mixing vessel may be subtracted from $(\hat{\dot{V}}_{12})_c$ to determine the volumetric rate of change in the second mixing vessel. The output of summation block 303 may then be sent via signal 304 to an Integral controller comprising an integral element 306 and a gain element 308 for multiplying it by $1/\hat{V}_2$ to determine the estimated volumetric ratio of the cement to total materials $\hat{R}_c$ in the second mixing vessel. The Integral controller may further include a gain element 310 for multiplying $\hat{R}_c$ by the total output flowrate $\dot{V}_s$ from the second mixing vessel, which may be measured, to determine the estimated total output flowrate $(\hat{\dot{V}}_s)_c$ of the cement. Further, the $(\hat{\dot{V}}_s)_c$ may be fed back to summation block 303 via signal 312, allowing it to be dynamically recomputed.

In this embodiment, State Feedback Controller 137 may be different in that it may engage in proportional control of the volumetric ratio of the water to the total materials in the second mixing vessel, comparing the desired water ratio $R_w^*$ to the estimated water ratio $\hat{R}_w$ determined by Volumetric Ratio Observer 141. The $\hat{R}_w$ may be calculated using the following equation:

$$\hat{R}_w = \left(\frac{(\hat{\dot{V}}_2)_w}{\hat{\dot{V}}_2}\right) \quad (27)$$

Describing State Feedback Controller 137 in more detail, the $\hat{R}_w$ and the $R_w^*$ may be fed to summation block 318 via signals 314 and 316 respectively. The output of summation block 318 may be fed to a proportional gain element 322 for multiplying it by a constant $K_p$ and a gain element 324 for multiplying it by the desired total output flowrate $\dot{V}_{12}^*$ from the first mixing vessel before being positively sent to a summation block 330. The $R_w^*$ may also pass through a gain element 328 for multiplying it by the total desired output flowrate of the slurry $\dot{V}_s^*$ exiting the second mixing vessel to determine the desired output flowrate of the water exiting the second vessel. This desired output flowrate of the water may be positively fed forward to summation block 330 via signal 326 to decouple the effect of the water exiting the second mixing vessel.

The output of State Feedback Controller 137 and the estimated flowrate of water $(\hat{\dot{V}}_{12})_w$ out of the first mixing vessel, as determined by Volumetric Ratio Observer 141, may be fed via respective signals 276 and 278 to a summation block 279 of Flow Regulator 139 where they may be compared. The Flow Regulator 193 is implemented in the same way as Flow Regulator 138 in FIG. 4 with the exception that the proportional control compares the estimated flowrate of water $(\hat{\dot{V}}_{12})_w$ out of the first mixing vessel with the commanded flowrate of water $(\dot{V}_{12})_w$ from State Feedback Controller 137. In particular, the output of summation block 279 may be sent via signal 280 to a proportional gain element 282 for multiplying it by a constant $K_m$ before sending it to another summation block 288, where the estimated volumetric disturbance flowrate of the water $(\hat{\dot{V}}_D)_w$ may be subtracted from it and from the estimated output flowrate of the water $(\hat{\dot{V}}_{12})_w$ from the first mixing vessel. The $(\hat{\dot{V}}_D)_w$ determined by Volumetric Ratio Observer 141 may be sent to summation block 288 via signal 284. Further, the estimated output flowrate of the water $(\hat{\dot{V}}_{12})_w$ from the first mixing vessel may be sent to summation block 288. The output of summation block 288 may be the commanded input water flowrate $\dot{V}_w^*$, which may be fed to Flow Modulator 32.

Figure 6:
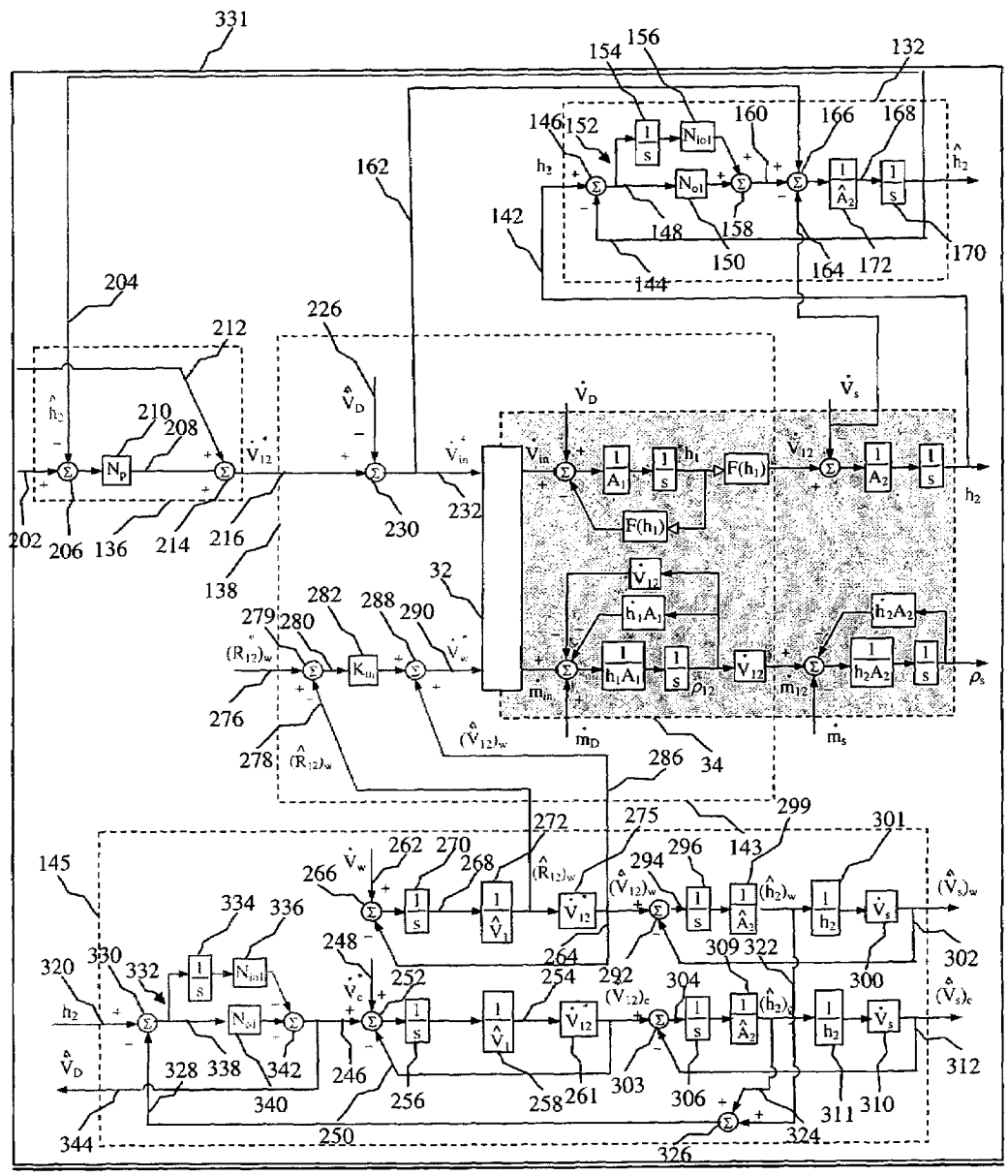
FIG. 6 is a state block diagram of yet another embodiment of a control system for controlling the mixing apparatus depicted in FIG. 1.

FIG. 6 depicts yet another embodiment of the volumetric ratio mixing control scheme in which the process being controlled comprises mixing cement and water together in a mixing apparatus containing two mixing vessels separated by a weir as shown in FIG. 1. FIG. 6 depicts a control system 331 that is similar to control system 130 of FIG. 4. Notably, control system 331 does not contain a Weir Flow Observer. Further, this embodiment extends the VRO in FIG. 4 from a one vessel implementation to a two vessel implementation for estimating the ratio of water to total materials in the second mixing vessel rather than the first mixing vessel. This two vessel VRO may also be used to estimate the total volumetric disturbance flowrate by applying an internal PI controller to the fluid height in the second mixing vessel. Moreover, within the VRO the commanded total volumetric flowrate $\dot{V}_{12}^*$ out of the first mixing vessel may be used as an estimate of the actual flowrate out of the first mixing vessel to determine the state feedback decoupling term for the Flow Regulator.

In this embodiment, a PI control loop may act directly on the water valve within the Flow Modulator using the actual measured input water flowrate as feedback (not shown). Tuned for a faster response time than the rest of the system, the water valve thus may be driven to produce the desired input water flowrate, resulting in zero steady state error. Therefore, an assumption may be made that all resulting volumetric disturbances are a result of errors in the cement valve between the commanded input cement flowrate and the actual delivered input cement flowrate $((\hat{\dot{V}}_D)_w=0; \hat{\dot{V}}_D=(\hat{\dot{V}}_D)_c)$. As mentioned earlier, the VRO may determine this disturbance by closing a loop on the estimated height of fluid in the second mixing vessel. The estimated height of fluid $\hat{h}_2$ in the second mixing vessel may be found by assuming the estimated cross-sectional area $\hat{A}_2$ of the second mixing vessel is known for a given volume of fluid in the vessel.

Since the estimated volumetric disturbance term $\hat{\dot{V}}_D$ is assumed to only contain errors due to the cement valve, it is only fed back into the upper portion of the Flow Regulator. When fed through the Flow Modulator this only makes adjustments to the cement command. In summary, valve errors in both valves are decoupled by the combined effects of the PI control on the water valve and the disturbance input decoupling on the cement valve.

The differences between control system 331 in FIG. 6 and control system 130 in FIG. 4 are described in more detail below. The volumetric disturbance flowrate of the cement being fed to summation block 248 via signal 246 may be determined by first feeding the height of the fluid $h_2$ in the second mixing vessel to summation block 330 via signal 320. At summation block 330, the sum of the estimated height of the water $(\hat{h}_2)_w$ and the estimated height of the cement $(\hat{h}_2)_c$ in the second mixing vessel may be subtracted from $h_2$, thereby estimating the height error for the second mixing vessel. This height error may be sent to a PI controller 332 via signal 338. The PI controller may comprise an integral element 334, an integral gain element 336 for multiplying the height error by $N_{io1}$, and a proportional gain element 340 for multiplying it by $N_{o1}$ before sending it to summation block 342. The output of summation block 342 is the estimated volumetric disturbance flowrate of the cement, which is equivalent to the estimated total volumetric disturbance flowrate $\hat{\dot{V}}_D$ as represented by signal 344. Also, no estimated volumetric disturbance flowrate of the water is fed to summation block 266 nor to summation block 288 of Flow Regulator 143 since this estimated rate is equivalent to zero.

Additionally, in Volumetric Ratio Observer 145, respective gain elements 274 and 260 may be replaced by respective gain elements 275 and 261, which may multiply the respective estimated ratios of the water and the cement in the first mixing vessel by the commanded total output flowrate $\dot{V}_{12}*$ from the first mixing vessel. Moreover, the estimated output flowrate of the water $(\hat{\dot{V}}_{12})_w$ from the first mixing vessel may be further passed to another summation block 292. At summation block 292, an estimated output flowrate of the water $(\hat{\dot{V}}_s)_w$ from the second mixing vessel may be subtracted from $(\hat{\dot{V}}_{12})_w$ to determine the volumetric rate of change in the second mixing vessel. The output of summation block 292 may then be sent via signal 294 to an Integral controller comprising an integral element 296 and a gain element 299 for multiplying it by $1/\hat{A}_2$ to determine the estimated height of the water $(\hat{h}_2)_w$ in the second mixing vessel. The Integral controller may further include a gain element 301 for multiplying $(\hat{h}_2)_w$ by $1/h_2$ and a gain element 300 for multiplying $(\hat{h}_2)_w$ by the measured total output flowrate $\dot{V}_s$ from the second mixing vessel to determine the estimated total output flowrate $(\hat{\dot{V}}_s)_w$ of the water. The $(\hat{\dot{V}}_s)_w$ may be fed back to summation block 292 via signal 302, allowing it to be dynamically recomputed.

Another difference between Volumetric Ratio Observer 145 and Volumetric Ratio Observer 140 is that the estimated output flowrate of the cement $(\hat{\dot{V}}_{12})_c$ from the second mixing vessel may be further passed to another summation block 303. At summation block 303, an estimated output flowrate of the cement $(\hat{\dot{V}}_s)_c$ from the second mixing vessel may be subtracted from $(\hat{\dot{V}}_{12})_c$ to determine the volumetric rate of change in the second mixing vessel. The output of summation block 303 may then be sent via signal 304 to an Integral controller comprising an integral element 306 and a gain element 309 for multiplying it by $1/\hat{A}_2$ to determine the estimated height of the cement $(\hat{h}_2)_w$ in the second mixing vessel. The Integral controller may further include a gain element 311 for multiplying $(\hat{h}_2)_c$ by $1/h_2$ and a gain element 310 for multiplying $(\hat{h}_2)_c$ by the measured total output flowrate $\dot{V}_s$ from the second mixing vessel to determine the estimated total output flowrate $(\hat{\dot{V}}_s)_c$ of the water. Further, the $(\hat{\dot{V}}_s)_c$ may be fed back to summation block 303 via signal 312, allowing it to be dynamically recomputed. The $(\hat{h}_2)_w$ and $(\hat{h}_2)_c$ may be fed to and added together at summation block 326 before being fed to summation block 330 via signal 328.

In addition, the total estimated volumetric disturbance flowrate $\hat{\dot{V}}_D$ determined by Volumetric Ratio Observer 145 may be negatively fed to a summation block 230 of Flow Regulator 143, which does not contain a proportional controller for the volumetric flowrate exiting the first mixing vessel as in FIG. 4. Instead, the $\hat{\dot{V}}_D$ may be subtracted from the commanded total output flowrate $\dot{V}_{12}*$ from the first mixing vessel, which may be fed to summation block 230 via signal 216. As in FIG. 4, the output of summation block 230 is the total commanded input flowrate $\dot{V}_{in}*$. FIG. 6 also depicts $\dot{V}_{in}*$ being fed via signal 162 from Flow Regulator 143 to summation block 166 of Height Observer 132.

Figure 11:
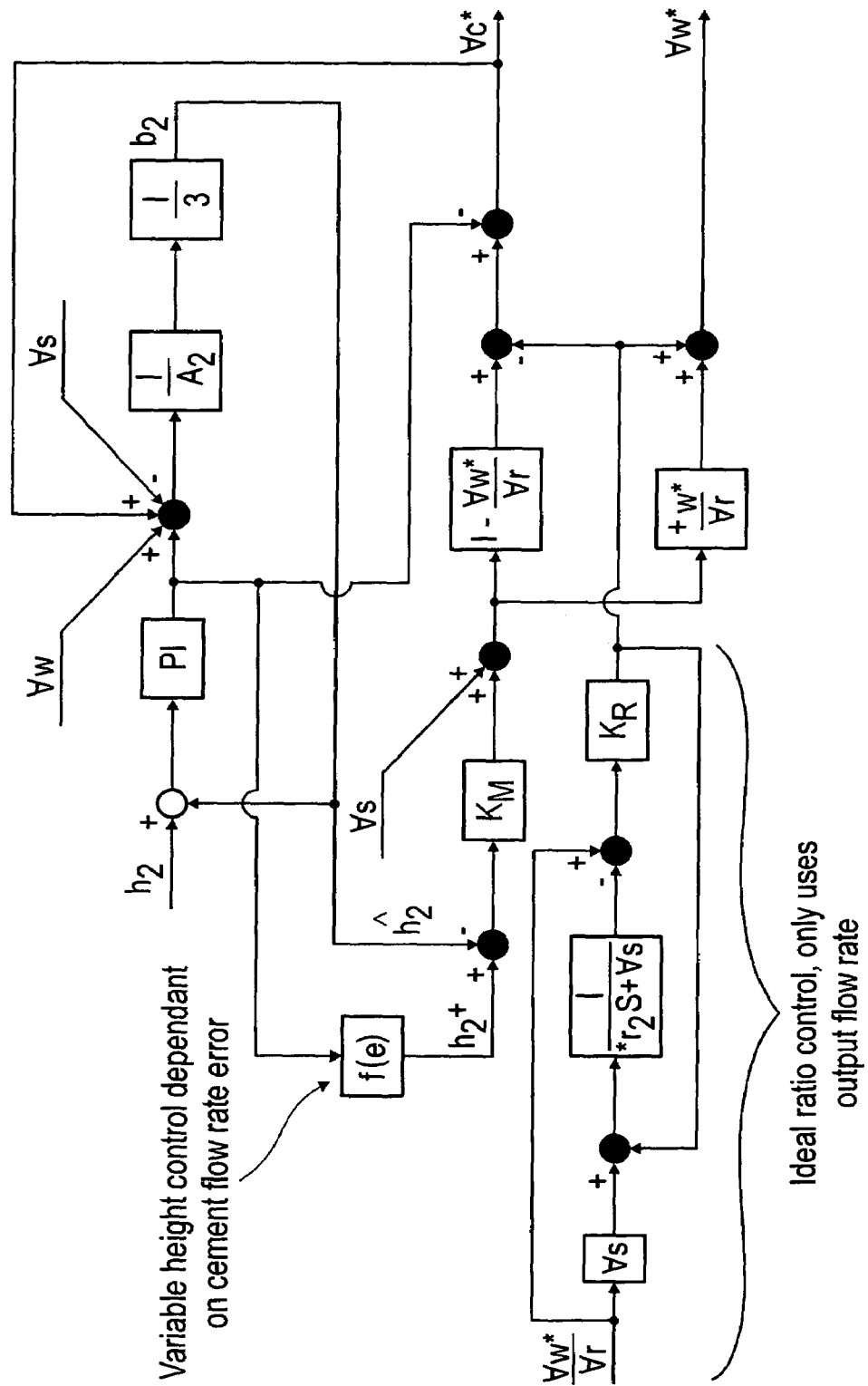
FIG. 11 shows yet another embodiment, with a different implementation of the disclosed volumetric control ideas.

FIG. 11 shows yet another embodiment, with a different implementation of the disclosed volumetric control ideas. Note the following two aspects of this embodiment:

1) Variable height control: The height setpoint is changed depending on the height observer error, or cement rate error. This is done to reduce effects of water/cement ratio problems if we have flow inconsistencies in the cement supply system. This normally occurs when we switch between cement supply bins or pods.
2) Ideal ratio control: Instead of a ratio observer outlined in the previous embodiments this system uses the idea case by only inputting the output flow rate and assuming all other values.

For a mixing system in which the measured parameters include the input water flowrate $\dot{V}_w$ into the first mixing vessel, the slurry density $\rho_{12}$ in the first mixing vessel, the fluid height $h_2$ in the second mixing vessel, and the output slurry flowrate $\dot{V}_s$ from the second mixing vessel, any of the embodiments discussed previously may be employed to control the system. However, one of the inherent problems with the mixing system depicted in FIG. 1 is the introduction of air into the mixture. Air entrained in the mixture may cause the overall slurry volume in the mixing vessels to be larger than expected, resulting in an increased $h_2$ value. Additionally, air entrained in the mixture may cause the measured density of the mixture to be lower than expected. For most applications it is ideal to be able to mix the water and the cement to a density and a volume that does not reflect the entrainment of air. Fortunately, for a system that includes four sensors for the four measured parameters mentioned above, the Volumetric Ratio Observer may be implemented to predict the ratio of not only the water and cement in the mixture but also the amount of air entrained therein. As such, the system can be controlled to mix exactly the desired proportions of water and cement.

Figure 7:
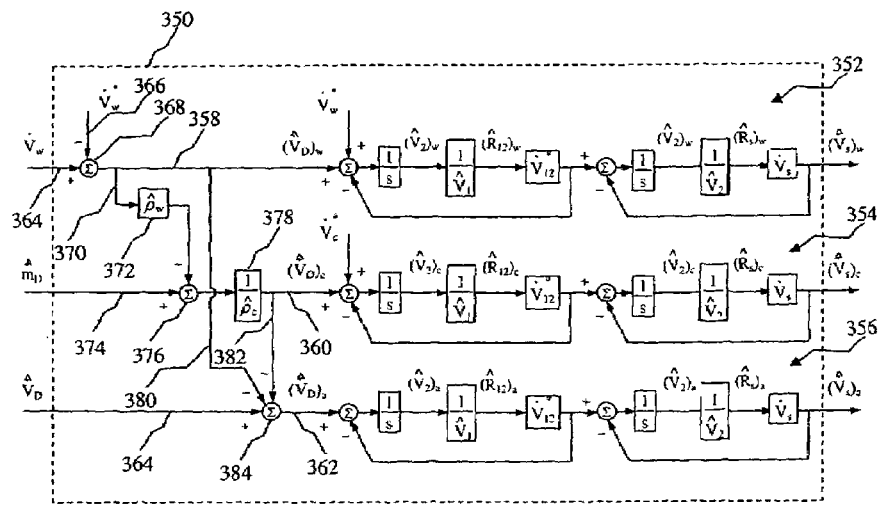
FIG. 7 is a state block diagram of yet another embodiment of a portion of a volumetric ratio observer for use with mixing three components utilizing a two-vessel mixing apparatus.

FIG. 7 illustrates an embodiment of the primary components of a two vessel Volumetric Ratio Observer 350 for modeling a system in which three components, i.e., water, cement, and air, are mixed through the system. The Volumetric Ratio Observer 350 includes control schemes 352, 354, and 356 for the water, the cement, and the air, respectively. Those control schemes are very similar to the control scheme shown in FIG. 3B except that the gain element for multiplying 1/s by the estimated total output flowrate $\hat{V}_{12}$ from the first mixing vessel is replaced by a gain element for multiplying 1/s by a commanded total output flowrate from the first mixing vessel $\dot{V}_{12}*$. In this embodiment, the commanded input water flowrate $\dot{V}_w*$ and the measured input water flowrate $\dot{V}_w$ are also known, allowing the disturbance in water flowrate to be calculated directly. That is, the $\dot{V}_w$ and the $\dot{V}_w*$ may be fed via respective signals 364 and 366 to a summation block 368 for comparing the two and thus determining the estimated volumetric disturbance flowrate of the water $(\hat{\dot{V}}_D)_w$.

Disturbances due to the cement delivery and due to the entrained air may be provided from external observer controllers that may be implemented via hardware or software modules. The total mass disturbance flowrate $\hat{\dot{m}}_D$ may be estimated by a Density Observer and the total volumetric disturbance flowrate $\hat{\dot{V}}_D$ may be estimated by a Height Observer as described previously. Suitable density observers are described in U.S. patent application Ser. No. 11/121,278, filed on May 3, 2005. Using the estimated parameter values of water density and cement density, these disturbances may be converted into the estimated volumetric flowrate disturbance $(\hat{\dot{V}}_D)_c$ of the cement and the estimated disturbance due to the volumetric flowrate of entrained air $(\hat{\dot{V}}_D)_a$. An assumption is made that the density of air is relatively insignificant ($\rho_a \cong 0$) compared to the density of water and cement.

More specifically, the $(\hat{\dot{V}}_D)_w$ computed by summation block 368 may be multiplied by the estimated density of water by passing it to a gain element 372 before sending it to another summation block 376 via signal 370. Gain element 372 determines the estimated mass flowrate of the water. The $\hat{\dot{m}}_D$ is also sent to summation block 376 via signal 374 where it may be compared to the estimated mass flowrate of the water to determine the estimated mass flowrate of the cement. This estimated mass flowrate of the cement may be sent via signal 360 to gain element 378 where it is multiplied by 1/(the estimated density of cement) to determine $(\hat{\dot{V}}_D)_c$. Both $(\hat{\dot{V}}_D)_w$ and $(\hat{\dot{V}}_D)_c$ may be fed to a summation block 384 via respective signals 380 and 382 where they may be subtracted from $\hat{\dot{V}}_D$, which is sent to element 384 via signal 364, to determine $(\hat{\dot{V}}_D)_a$. The disturbance flowrates $(\hat{\dot{V}}_D)_w$, $(\hat{\dot{V}}_D)_c$, and $(\hat{\dot{V}}_D)_a$ for each component may then be sent to controllers via respective signals 358, 360, and 362 to implement respective control schemes 352, 354, and 356.

Using the foregoing implementation, the components may be separated and the densities of the water and cement mixture excluding entrained air for the first mixing vessel and the second mixing vessel may be calculated from estimated parameters within the VRO in accordance with the following equations:

$$\hat{\rho}_{12} = \left( \frac{\hat{\rho}_w (\hat{V}_1)_w + \hat{\rho}_c (\hat{V}_1)_c}{(\hat{V}_1)_w + (\hat{V}_1)_c} \right) \quad (28)$$

$$\hat{\rho}_s = \left( \frac{\hat{\rho}_w (\hat{V}_2)_w + \hat{\rho}_c (\hat{V}_2)_c}{(\hat{V}_2)_w + (\hat{V}_2)_c} \right) \quad (29)$$

Figure 8:
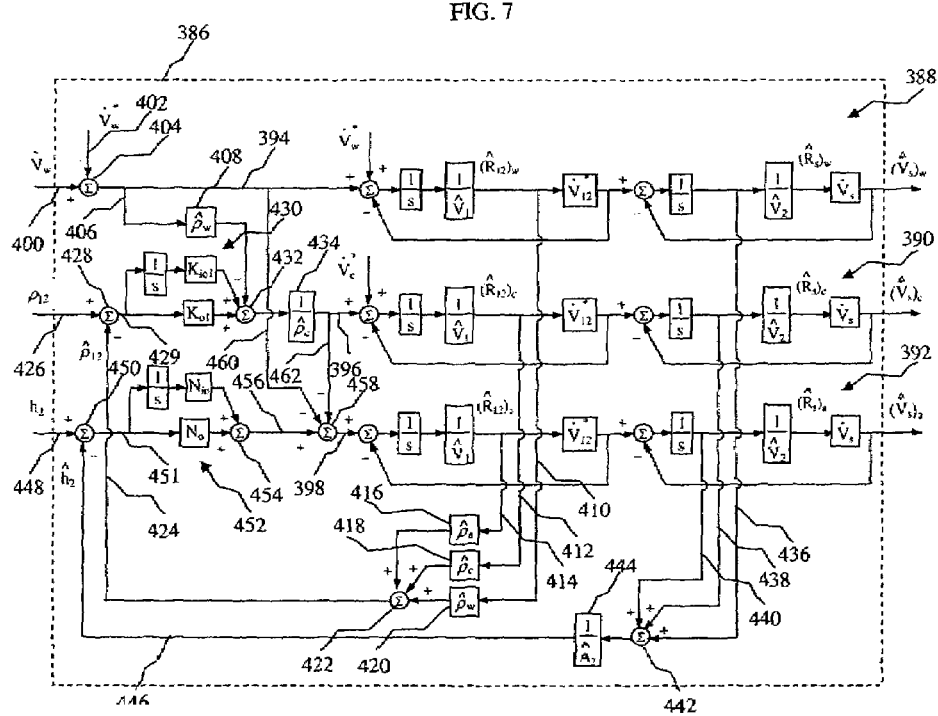
FIG. 8 is a state block diagram of still another embodiment of a volumetric ratio observer for use with mixing three components utilizing a two-vessel mixing apparatus.

FIG. 8 illustrates another embodiment of the primary components of Volumetric Ratio Observer 386 for modeling a system in which water, cement, and air are mixed in a two-vessel mixing apparatus. The Volumetric Ratio Observer 386 includes control schemes 388, 390, and 392 for the water, the cement, and the air, respectively. Those control schemes are very similar to the control scheme shown in FIG. 3B except that the $\hat{\dot{V}}_{12}$ gain element may be replaced by a $\dot{V}_{12}*$ gain element. Again, with the commanded input water flowrate $\dot{V}_w*$ and the measured input water flowrate $\dot{V}_w$ being known, the disturbance in water flowrate may be calculated directly. That is, the $\dot{V}_w$ and the $\dot{V}_w*$ may be fed via respective signals 400 and 402 to a summation block 404 for comparing the two and thus determining the estimated volumetric disturbance flowrate of the water $(\hat{\dot{V}}_D)_w$.

In this embodiment, disturbances due to cement delivery and due to entrained air are provided from internal PI feedback loops on the slurry density in the first mixing vessel and the fluid height in the second mixing vessel as shown. The mass disturbance flowrate $\hat{\dot{m}}_D$ may be calculated through a PI controller that compares the measured slurry density in the first mixing vessel to the estimated density calculated from the combined water, cement, and air mixture in the first mixing vessel. More specifically, the volumetric ratio of each component to the total materials in the first mixing vessel may be calculated by the PI controller of each control scheme. Those volumetric ratios may then be sent via respective signals 410, 412, and 414 to respective gain elements 416, 418, and 420 for multiplying the volumetric ratios by the estimated densities of air $\hat{\rho}_a$, of cement $\hat{\rho}_c$, and of water $\hat{\rho}_w$, respectively to determine the estimated fraction of the total density in the first mixing vessel for each component. Those estimated fractions may then be summed at summation block 422 to determine the estimated total density of the slurry $\hat{\rho}_{12}$ in the first mixing vessel. The measured slurry density $\rho_{12}$ and the estimated slurry density $\hat{\rho}_{12}$ may be sent to a summation block 428 for calculating the difference between the two and then to a PI controller 430 for determining $\hat{\dot{m}}_D$.

The $(\hat{\dot{V}}_D)_w$ computed by summation block 404 may be multiplied by the estimated density of water by passing it to a gain element 408 for determining the estimated input mass flowrate of the water before sending it to another summation block 432 via signal 406 where it is subtracted from the $\hat{\dot{m}}_D$. The output of summation block 432 thus may be the estimated mass flowrate of the cement. The estimated mass flowrate of the cement may be passed through gain element 434 where it may be multiplied by 1/(the estimated density of cement) to determine $(\hat{\dot{V}}_D)_c$.

The total volumetric disturbance flowrate $\hat{\dot{V}}_D$ may be calculated through a PI controller that compares the measured fluid height $h_2$ to the estimated height $\hat{h}_2$ in the second mixing vessel calculated from the combined water, cement, and air volumes in the second mixing vessel, assuming that its cross-sectional area is known. More specifically, $\hat{h}_2$ may be calculated by sending the volumes of water, cement, and air in the second mixing vessel, as determined via control schemes 388, 390, and 392, to a summation block 442 via signals 436, 438, and 440, respectively. At summation block 442, those volumes may be summed together to determine the total volume of fluid in the second mixing vessel. The total volume may then be sent to a gain element 444 for multiplying it by 1/(the estimated cross-sectional area of the second mixing vessel) to determine $\hat{h}_2$ before being sent to summation block 450. The summation block 450 may determine the difference between $h_2$ and $\hat{h}_2$, and that difference may be sent to a PI controller 452 via signal 451. The outputs of the integral portion and the proportional portion of PI controller 452 may then be summed at summation block 454 to determine the $\hat{\dot{V}}_D$. Then the $\hat{\dot{V}}_D$ may be sent to another summation block 458 via signal 456. Both $(\hat{\dot{V}}_D)_w$ and $(\hat{\dot{V}}_D)_c$ may be fed to a summation block 458 via respective signals 460 and 462 where they may be subtracted from $\hat{\dot{V}}_D$ to determine the volumetric disturbance flowrate in the air $(\hat{\dot{V}}_D)_a$. The disturbance flowrates $(\hat{\dot{V}}_D)_w$, $(\hat{\dot{V}}_D)_c$, and $(\hat{\dot{V}}_D)_a$ for each component may then be sent to controllers via respective signals 394, 396, and 398 to implement respective control schemes 388, 390, and 392. Additionally, Equations 28 and 29 may be implemented to estimate the mixture densities in the first and second mixing vessels due to water and cement but excluding entrained air.

Figure 9:
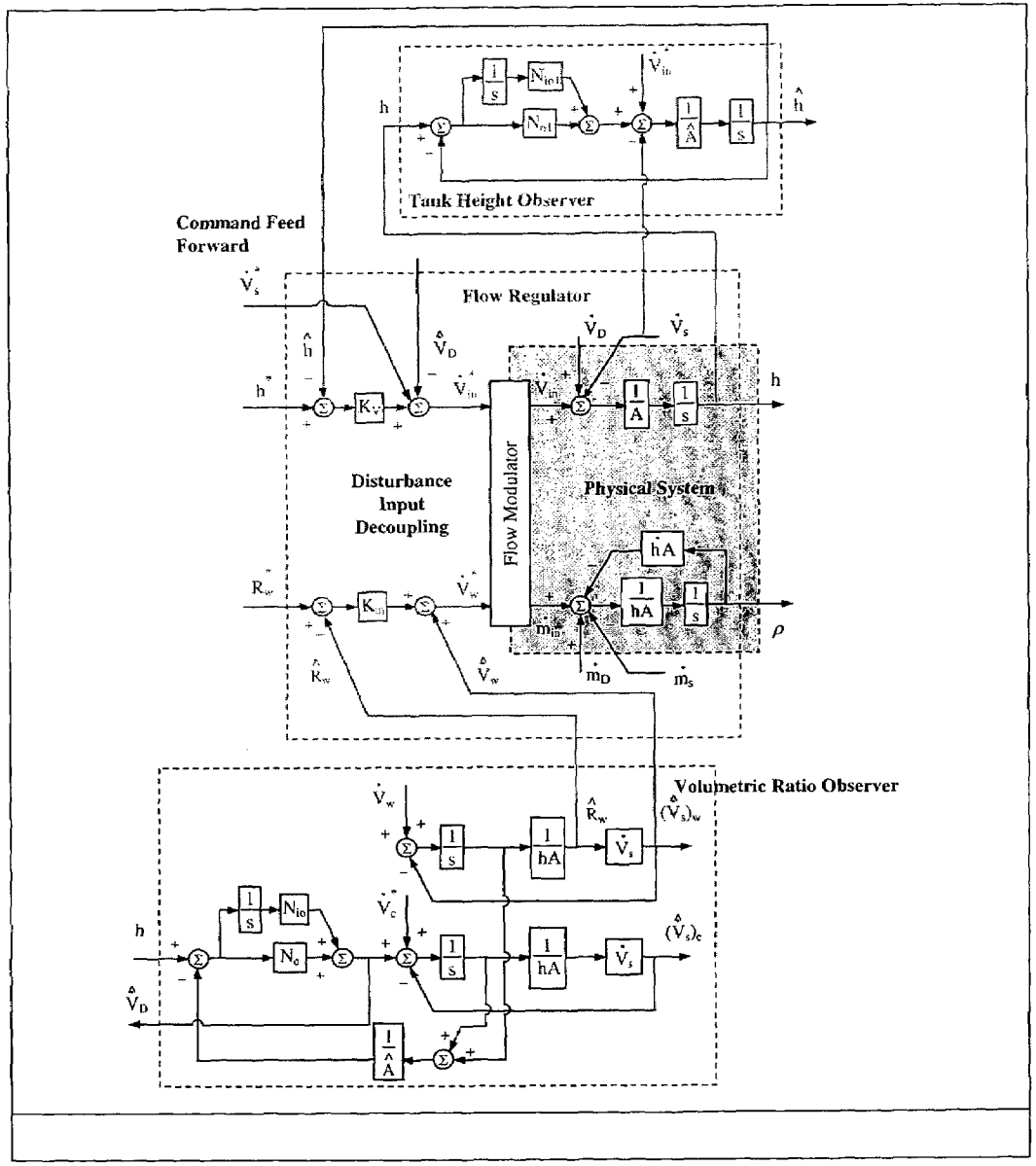
FIG. 9 shows how a process for mixing multiple components in a mixing apparatus comprising a single vessel or tank can be controlled using a volumetric ratio mixing control scheme.

As shown in FIG. 9, a process for mixing multiple components in a mixing apparatus comprising a single vessel or tank may also be controlled using a volumetric ratio mixing control scheme. In one embodiment, the components being combined in the mixing apparatus may be cement and water. However, it is understood that other materials may also be combined in the single vessel. FIG. 9 depicts a control system 500 that includes a Flow Regulator 502, a Height Observers 506, and a Volumetric Ratio Observer 530. The Flow Regulator 502 includes a Flow Modulator 32, shown in detail in FIG. 2, a State Feedback Controller 510, and a model of a physical system 508 similar to the physical system 34 shown in FIG. 2. The physical system 508 is different from physical system 34 of FIG. 2 in that it only models a single mixing vessel with the height and density of the mixture in the single mixing vessel given as outputs. That is, the volumetric rate of change in the mixing vessel of physical system 508 is converted to the rate of change of height in the mixing vessel, which when integrated results in the height h of the slurry in the mixing vessel. Further, the mass rate of change in the mixing vessel of physical system 508 is converted to the rate of change of the density in the mixing vessel, which when integrated results in the density ρ of the slurry in the mixing vessel.

The measured height h of the slurry in the mixing vessel as given by the model of physical system 508 may be sent to Height Observer 506, which contains the same components as Height Observer 132 in FIG. 6. The Height Observer 506 may estimate the height ĥ of the fluid in the mixing vessel and feed that to Flow Regulator 502. The measured height h may also be fed to Volumetric Ratio Observer 530, which is similar to the Volumetric Ratio Observer 145 shown in FIG. 6 except that it only contains one feedback loop for estimating the volumetric flowrate $(\hat{\dot{V}}_s)_w$ of the water exiting the mixing vessel and the ratio of water to total materials $\hat{R}_w$ in the mixing vessel and one feedback loop for estimating the volumetric flowrate $(\hat{\dot{V}}_s)_c$. The Volumetric Ratio Observer 530 may estimate the total volumetric disturbance flowrate $\hat{\dot{V}}_D$ in the same manner as does Volumetric Ratio Observer 145.

Turning to Flow Regulator 502, its upper portion includes a summation block 514 to which ĥ may be sent via signal 510 and a commanded height h* may be sent via signal 512. The summation block 514 may subtract ĥ from h*. The output of summation block 514 may then be sent to a proportional gain element 518 via signal 516 where it may be multiplied by a constant $K_V$ before being sent to another summation block 524. A commanded volumetric flowrate $\dot{V}_s^*$ of the slurry exiting the mixing vessel and $\hat{\dot{V}}_D$ as determined by Volumetric Ratio Observer 530 may be also be fed to summation block 524 via signals 520 and 522, respectively. The summation block 514 may subtract $\hat{\dot{V}}_D$ from the sum of the output of gain element 518 and $\dot{V}_s^*$ to determine the total commanded input flowrate $\dot{V}_{in}^*$ to the mixing vessel, which may be fed to Flow Modulator 32 via signal 526.

The lower portion of Flow Regulator 502 may include a summation block 538 to which a desired water ratio $R_w^*$ and the estimated water ratio $(\hat{R}_{12})_w$ in the first mixing vessel may be fed via signals 538 and 532, respectively. The summation block 538 subtracts $(\hat{R}_{12})_w$ from $R_w^*$, and its output may then be fed via signal 540 to a proportional gain element 542 for multiplying the output by $K_m$ before being sent to a summation block 544. The estimated output flowrate of the water $(\hat{\dot{V}}_s)_w$ from the mixing vessel also may be fed back to the Flow Regulator for decoupling purposes. That is, the $(\hat{\dot{V}}_s)_w$ may be fed via signal 534 to summation block 544 where the commanded input flowrate of the water $\dot{V}_w^*$ may be computed. The $\dot{V}_w^*$ may be fed to Flow Modulator 32 via signal 546.

In the various embodiments shown in FIGS. 2-9, the control schemes may be implemented by hardware or by software via a computerized system. A person of ordinary skill in the art would know how to create and use such hardware or software to implement the control schemes.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

The mixing apparatus shown in FIG. 1 was assembled and operated using the embodiment of the control scheme shown in FIG. 6. Various parameters of the mixing process were determined and plotted as a function of time in FIG. 10. More specifically, line 550, labeled as the slurry recirculation density, represents the change in the measured slurry density in the first vessel. Line 552, labeled as the Ve_ density represents the change in the density as given by the volumetric ratio observer with active disturbance decoupling. Line 554, labeled as the tub level, represents the change in the height of the slurry in the second vessel. Line 556, labeled as the cement valve position, represents the change in the position of the valve for controlling the flowrate of the cement into the mixing apparatus. Line 558, labeled as h2_hat, represents the change in the estimated height of the slurry in the second vessel as determined by the height observer, which filters the height sensor without zero lag. Line 560, labeled as the water valve position, represents the change in the position of the valve for controlling the flowrate of the cement into the mixing apparatus.

Figure 10:
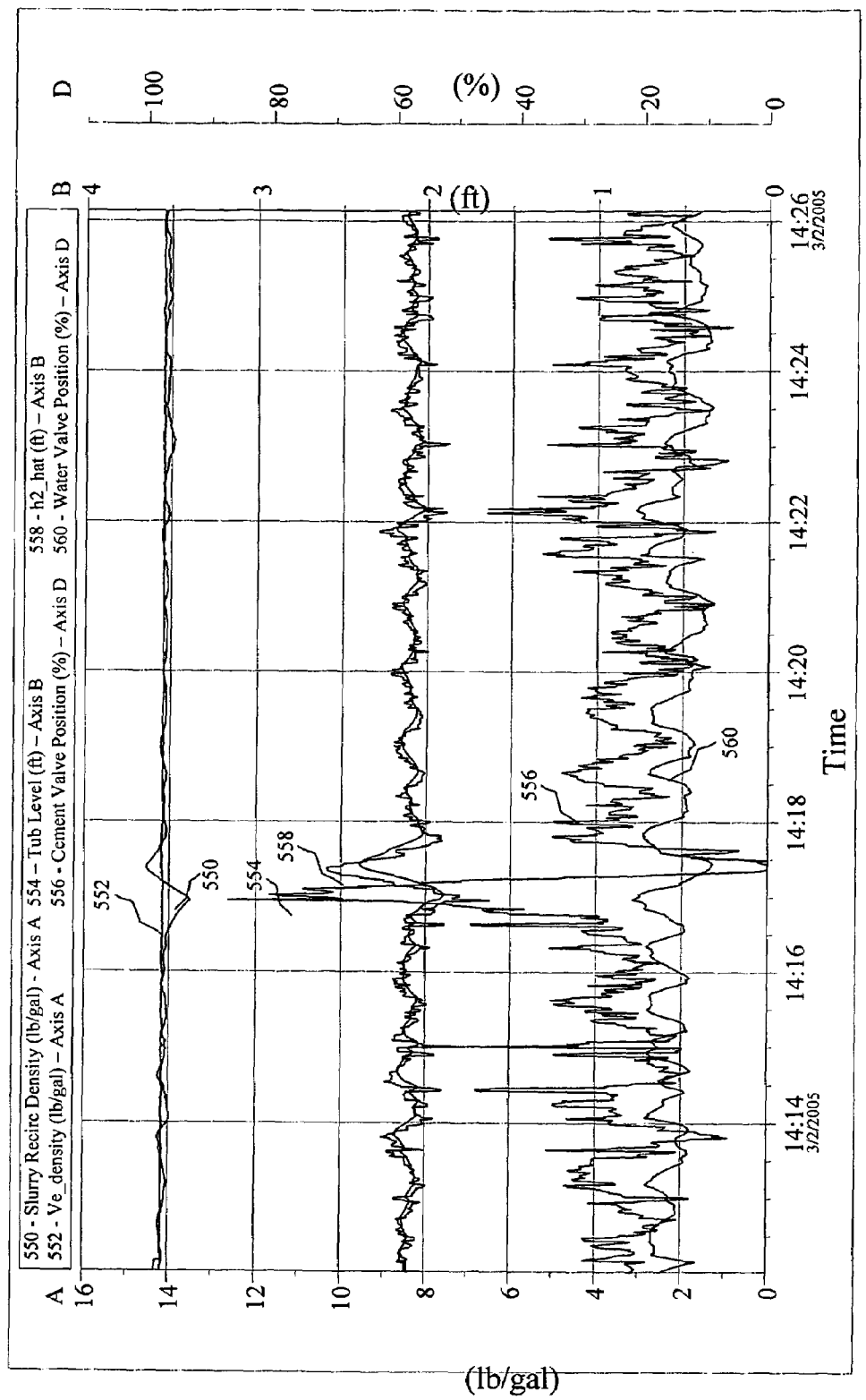
FIG. 10 shows results obtained from systems according to FIGS. 2-9.

The results shown in FIG. 10 illustrate that the system is capable of controlling the relative volumes of cement and water in the mixing tub. Having line 550 track line 552 indicates that the system is producing the desired density and therefore the desired relative volumes. Also, the tub level is maintained near a desired amount, showing that the flowrate is maintained near its desired amount. It should be noted that at time 14 hr.: 17 min. the cement delivery system runs low and a new supply is initiated. This is a common occurrence and is not a problem with the control system.

FIG. 11 shows yet another embodiment, with a different implementation of the disclosed volumetric control ideas. Note the following two aspects of this embodiment:

1) Variable height control: The height setpoint is changed depending on the height observer error, or cement rate error. This is done to reduce effects of water/cement ratio problems if we have flow inconsistencies in the cement supply system. This normally occurs when we switch between cement supply bins or pods.
2) Ideal ratio control: Instead of a ratio observer outlined in the previous embodiments this system uses the idea case by only inputting the output flow rate and assuming all other values.

According to various embodiments, methods of determining an estimated volumetric ratio of a material to total materials in a mixing vessel comprise: summing a commanded input flowrate of the material and a volumetric disturbance flowrate of the material being fed to the mixing vessel; estimating the output flowrate of the material exiting the mixing vessel; negatively feeding back the estimated output flowrate of the material to obtain an estimated volumetric rate of change of the material in the mixing vessel; and integrating the estimated volumetric rate of change of the material to compute the estimated volumetric ratio of the material to the total materials in the mixing vessel.

In more embodiments, methods of determining an estimated volumetric ratio of a material to total materials in a second mixing vessel that is partially separated from a first mixing vessel comprise: summing a commanded input flowrate of the material and a volumetric disturbance flowrate of the material being fed to the first mixing vessel; estimating an output flowrate of the material exiting the first mixing vessel; negatively feeding back the estimated output flowrate of the material to obtain an estimated volumetric rate of change of the material in the first mixing vessel; integrating the estimated volumetric rate of change of the material in the first mixing vessel to dynamically recompute the estimated output flowrate of the material exiting the first mixing vessel; estimating an output flowrate of the material exiting the second mixing vessel; negatively feeding back the estimated output flowrate of the material exiting the second mixing vessel and summing it with the estimated output flowrate of the material exiting the first mixing vessel, thereby obtaining an estimation of a volumetric rate of change of the material in the second mixing vessel; and integrating the estimated volumetric rate of change of the material in the second mixing vessel to compute the estimated volumetric ratio of the material to the total materials in the second mixing vessel.

In additional embodiments, methods of determining an estimated volumetric ratio of a second material to total materials in a first mixing vessel that is partially separated from a second mixing vessel comprise: measuring a height of the total materials in the second mixing vessel; comparing the height of the total materials in the second mixing vessel to a summation of an estimated height of a first material in the second mixing vessel and an estimated height of the second material in the second mixing vessel to obtain an estimation of a height error for the second mixing vessel; feeding the estimation of the height error to a controller to compute an estimated total volumetric disturbance flowrate; computing a summation of (a) a commanded input flowrate of the second material to the first mixing vessel, (b) the estimated total volumetric disturbance flowrate, and (c) a negative value of an estimated output flowrate of the second material from the first mixing vessel, thereby obtaining an estimated volumetric rate of change of the second material in the first mixing vessel; and integrating the estimated volumetric rate of change of the second material to obtain the estimated volumetric ratio of the second material to total materials in the first mixing vessel.

According to other embodiments, systems for determining an estimated volumetric ratio of a material to total materials in a mixing vessel comprise: a summation block for determining an estimated volumetric rate of change of the material in the mixing vessel; an integration element for determining an estimated volume of the material in the mixing vessel based on the estimated volumetric rate of change of the material in the mixing vessel; a first gain element for converting the estimated volume of the material in the mixing vessel to the estimated volumetric ratio of the material to the total materials; and a second gain element for converting the estimated volumetric ratio of the material to the total materials to the output flowrate of the material from the mixing vessel.

In more embodiments, systems for determining an estimated volumetric ratio of a material to total materials in a second mixing vessel that is partially separated from a first mixing vessel comprise: a first summation block for determining an estimated volumetric rate of change of the material in the first mixing vessel; a first integration element for integrating the estimated volumetric rate of change of the material in the first mixing vessel to determine an estimated volume of the material in the first mixing vessel; a first gain element for converting the estimated volume of the material in the first mixing vessel to the estimated volumetric ratio of the material to the total materials in the first mixing vessel; a second gain element for converting the estimated volumetric ratio of the material to the total materials in the first mixing vessel to the output flowrate of the material from the first mixing vessel; a second summation block for determining an estimated volumetric rate of change of the material in the second mixing vessel based on the output flowrate of the material from the first mixing vessel; a second integration element for integrating the estimated volumetric rate of change of the material in the second mixing vessel to determine the estimated volume of the material in the second mixing vessel; a third gain element for converting the estimated volume of the material in the second mixing vessel to the estimated volumetric ratio of the material to the total materials in the second mixing vessel; and a fourth gain element for converting the estimated volumetric ratio of the material to the total materials in the second mixing vessel to the output flowrate of the material from the second mixing vessel.

In yet more embodiments, systems for determining an estimated volumetric ratio of a second material to total materials in a first mixing vessel that is partially separated from a second mixing vessel comprise: a sensor for measuring a height of the total materials in the second mixing vessel; a first summation block for determining an estimation of a height error for the second mixing vessel by comparing the height of the total materials in the second mixing vessel with a summation of an estimated height of a first material in the second mixing vessel and an estimated height of the second material in the second mixing vessel; a controller for determining an estimated volumetric disturbance flowrate of the second material based on the height error; a second summation block for determining an estimated volumetric rate of change of the second material in the first mixing vessel; an integration element for integrating the estimated volumetric rate of change of the second material in the first mixing vessel to determine the estimated volume of the second material in the first mixing vessel; a first gain element for converting the estimated volume of the second material in the first mixing vessel to the estimated volumetric ratio of the material to the total materials in the first mixing vessel; and a second gain element for converting the estimated volumetric ratio of the material to the total materials in the first mixing vessel to an output flowrate of the material from the first mixing vessel.

According to additional embodiments, methods of controlling a volumetric ratio of a material to total materials in a mixing vessel comprise: estimating the volumetric ratio of the material to the total materials in the mixing vessel and an output flowrate of the material from the mixing vessel using a volumetric ratio observer; dynamically recomputing the commanded input flowrate of the material based on outputs of the volumetric ratio observer using a flow regulator; and adjusting an input valve of the material based on the commanded input flowrate of the material using a flow modulator. In one embodiment, the mixing vessel comprises a first mixing vessel partially separated from a second mixing vessel. In this case, a height observer may be used to estimate the height of the total materials in the second mixing vessel, and the volumetric ratio observer may be used to estimate the volumetric ratio of the material to the total materials in the first mixing vessel and an output flowrate of the material from the first mixing vessel.

In additional embodiments, methods of controlling a volumetric ratio of a material to total materials in a first mixing vessel that is partially separated from a second mixing vessel comprise: estimating the volumetric ratio of the material to the total materials in the second mixing vessel, an output flowrate of the material from the first mixing vessel, and a volumetric disturbance flowrate of the material using a volumetric ratio observer having the following inputs: a commanded input flowrate of the material and a measured input flowrate of the material; computing a commanded output flowrate of the material from the first mixing vessel using a state feedback controller having the following inputs: a commanded volumetric ratio of the material to the total materials in the second mixing vessel and the estimated volumetric ratio of the material to the total materials in the second mixing vessel; dynamically recomputing the commanded input flowrate of the material using a flow regulator having the following inputs: the estimated input flowrate error of the material and the estimated output flowrate of the material from the first mixing vessel; and adjusting an input valve of the material based on the commanded input flowrate of the material using a flow modulator.

In yet more embodiments, methods of controlling a volumetric ratio of a material to total materials in a first mixing vessel that is partially separated from a second mixing vessel comprise: estimating a total volumetric disturbance flowrate, the volumetric ratio of the material to the total materials in the first mixing vessel, and an output flowrate of the material from the first mixing vessel using a volumetric ratio observer having the following inputs: a measured height of the total materials in the second mixing vessel; a commanded input flowrate of the material; and a commanded input flowrate of a second material that is also being fed to the first mixing vessel; dynamically recomputing the commanded input flowrate of the material using a flow regulator having the following inputs: a commanded volumetric ratio of the material to the total materials in the first mixing vessel; an estimated volumetric ratio of the material to the total materials in the first mixing vessel; and the estimated output flowrate of the material from the first mixing vessel; and adjusting an input valve of the material based on the commanded input flowrate of the material using a flow modulator.

According to additional embodiments, systems for controlling a volumetric ratio of a material to total materials in a mixing vessel comprise: a volumetric ratio observer for estimating the volumetric ratio of the material to the total materials in the mixing vessel and an output flowrate of the material from the mixing vessel; a flow regulator coupled to the volumetric ratio observer for dynamically recomputing a commanded input flowrate of the material based on outputs of the volumetric ratio observer; and a flow modulator coupled to the flow regulator for adjusting an input valve of the material based on the commanded input flowrate of the material. In one embodiment, the mixing vessel comprises a first mixing vessel partially separated from a second mixing vessel. In this case, a height observer may be used to estimate the height of the total materials in the second mixing vessel, and the volumetric ratio observer may be capable of estimating the volumetric ratio of the material to the total materials in the first mixing vessel and an output flowrate of the material from the first mixing vessel.

In more embodiments, systems for controlling a volumetric ratio of a material to total materials in a first mixing vessel that is partially separated from a second mixing vessel comprise: a volumetric ratio observer for estimating the volumetric ratio of the material to the total materials in the second mixing vessel, an output flowrate of the material from the first mixing vessel, and a volumetric disturbance flowrate of the material, the volumetric ratio observer having the following inputs: an estimated total volumetric disturbance flowrate and a commanded input flowrate of the material; a state feedback controller for computing a commanded output flowrate of the material from the first mixing vessel, the state feedback controller having the following inputs: a commanded volumetric ratio of the material to the total materials in the second mixing vessel and the estimated volumetric ratio of the material to the total materials in the second mixing vessel; a flow regulator coupled to the state feedback controller and to the volumetric ratio observer for dynamically recomputing the commanded input flowrate of the material, the flow regulator having the following inputs: the estimated volumetric disturbance flowrate of the material and the estimated output flowrate of the material from the first mixing vessel; and a flow modulator coupled to the flow regulator for adjusting an input valve of the material based on the commanded input flowrate of the material.

In still more embodiments, systems for controlling a volumetric ratio of a material to total materials in a first mixing vessel that is partially separated from a second mixing vessel comprise: a volumetric ratio observer for estimating a total volumetric disturbance flowrate, the volumetric ratio of the material to the total materials in the first mixing vessel, and an output flowrate of the material from the first mixing vessel, the volumetric ratio observer having the following inputs: a measured height of the total materials in the second mixing vessel; a commanded input flowrate of the material; and a commanded input flowrate of a second material that is also being fed to the first mixing vessel; a flow regulator coupled to the volumetric ratio observer for dynamically recomputing a commanded input flowrate of the material having the following inputs: a commanded volumetric ratio of the material to the total materials in the first mixing vessel; the estimated volumetric ratio of the material to the total materials in the first mixing vessel; and the estimated output flowrate of the material from the first mixing vessel; and a flow modulator coupled to the flow regulator for adjusting an input valve of the material based on the commanded input flowrate of the material.

In various embodiments, methods comprise: generating multiple estimates of multiple respective component volumes; generating a feedback correction using at least one physical measurement of a mixed product; and combining the feedback correction with at least mone of the estimates to provide a closed loop system. In more embodiments, methods of controlling a mixing process comprise: in a first process, converting high-level comanded inputs (e.g., the height of the slurry in a mixing vessel and the volumetric ratio of one material to the total materials in a mixing vessel) into intermediate commanded targets (e.g. the desired total flowrate from a mixing vessel and the desired volumetric ratio of one material to the total materials in a mixing vessel); and in at least one additional process, converting the intermediate commanded targets into low-level control settings (e.g., the valve positions), wherein a disturbance value is fed back into the first process to decouple nonlinearities. In further embodiments, methods of controlling a mixing process comprise: in a first process, converting high-level commanded inputs into intermediate commanded targets; in at least one additional process, converting the intermediate commanded targets into low-level control settings; and using feedforward of a total flowrate to decouple effects of an output flow. In yet more embodiments, methods for controlling a mixing process which is affected by physical nonlinearities comprise: compensating for the nonlinearities to provide an equivalent virtual system having more stable eigenvalues; and controlling the mixing process with reference to the equivalent virtual system.

In various embodiments, systems comprise: multiple volumetric estimators for multiple respective components; and a feedback block for combining at least one physical measurement of a mixed product with the estimators to provide a closed loop system. In more embodiments, systems for converting the intermediate commanded targets into low-level control settings, wherein the system is capable of feeding a disturbance value back into the first process to decouple nonlinearities. In additional embodiments, systems for controlling a mixing process comprise: a first process for converting high-level commanded inputs into intermediate commanded targets; and at least one additional process for converting the intermediate commanded targets into low-level control settings, wherein the system is capable of using feedforward of a total flowrate to decouple effects of an output flow. In yet more embodiments, systems for controlling a mixing process which is affected by physical nonlinearities comprise: at least one low-level control loop for controlling inputs to the mixing process; a real-time simulation of an equivalent virtual system in which the physical nonlinearities of the mixing process are at least partially compensated to provide for more stable eigenvalue behavior; and an additional control loop for controlling the equivalent virtual system, wherein the system is capable of using outputs of the additional control loop to at least partially control the low-level control loop.

According to various teachings of the present application, there is provided: A method of controlling a mixing process, comprising: in a first process, converting high-level commanded inputs into intermediate commanded targets; and in at least one additional process, converting said intermediate commanded targets into low-level control settings; wherein a disturbance value is fed back into said first process to decouple nonlinearities.

According to various teachings of the present application, there is provided: A method of controlling a mixing process, comprising the actions of: in a first process, converting high-level commanded inputs into intermediate commanded targets; in at least one additional process, converting said intermediate commanded targets into low-level control settings; and using feedforward of total flow rate to decouple effects of output flow.

According to various teachings of the present application, there is provided: A method for controlling a mixing process which is affected by physical nonlinearities, comprising the actions of: compensating for nonlinearities, to provide an equivalent virtual system with more nearly stationary eigenvalues; and controlling the mixing process with reference to said equivalent virtual system.

Modifications and Variations

While preferred embodiments of the invention have been shown and described, modifications thereof can be made by one skilled in the art without departing from the spirit and teachings of the invention. The embodiments described herein are exemplary only and are not intended to be limiting. Many variations and modifications of the invention disclosed herein are possible and are within the scope of the invention.

Various modifications, alternatives and implementations are suggested above, but many others are possible. For example, the observers are not necessarily implemented as in any of the examples above, but can be modified in various ways. For another example, the embodiments described above do not stand in isolation, but can be combined in various ways.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of controlling a volumetric ratio of a first material to total materials in a mixing vessel, comprising:
   estimating the volumetric ratio of the first material to the total materials in the mixing vessel and an output flowrate of the first material from the mixing vessel using a volumetric ratio observer, which provides filtered, zero-lag estimates of the actual volumetric ratios of materials in the mixing vessel by mathematical modeling that includes a modeled volumetric flowrate disturbance component;
   dynamically recomputing a commanded input flowrate of the first material based on outputs of the volumetric ratio observer using a flow regulator; and
   adjusting an input valve of the first material based on the commanded input flowrate of the material using a flow modulator that transforms the commanded input flow rate and a commanded volumetric ratio of the first material to total materials into positions of the input valve, and so volumetrically control the input valve utilizing the estimated volumetric ratio.

2. The method of claim 1, wherein the mixing vessel comprises a first mixing vessel partially separated from a second mixing vessel.

3. The method of claim 2, further comprising estimating a height of the total materials in the second mixing vessel using a height observer.

4. The method of claim 3, further comprising:
   estimating a total volumetric disturbance flowrate using the height observer which has the following inputs: a measured height of the total materials in the second mixing vessel; a commanded input flowrate of the total materials; and a measured output flowrate of the total materials from the second mixing vessel; and
   estimating a volumetric disturbance flowrate of the first material using the volumetric ratio observer, which has the following inputs: a measured input flowrate of the first material and a commanded input flowrate of the first material,
   wherein the flow regulator has the following inputs: the estimated volumetric ratio of the first material to the total materials in the first mixing vessel; the estimated volumetric disturbance flowrate of the first material; and the estimated output flowrate of the first material from the first mixing vessel.

5. The method of claim 3, further comprising estimating an output flowrate of the total materials from the first mixing vessel using a weir flow observer having the following inputs: the estimated height of the total materials in the second mixing vessel; a measured height of the total materials in the second mixing vessel; and a measured output flowrate of the total materials from the second mixing vessel.

6. The method of claim 5, wherein the weir flow observer comprises a PI controller.

7. The method of claim 6, wherein the weir flow observer further comprises an Integral controller coupled to the PI controller.

8. The method of claim 3, further comprising computing a commanded output flowrate of the total materials from the first mixing vessel using a state feedback controller having the following inputs: a commanded height of the total materials in the second mixing vessel; the estimated height of the total materials in the second mixing vessel; and a commanded output flowrate of the total materials from the second mixing vessel.

9. The method of claim 8, further comprising dynamically recomputing a commanded input flowrate of the total materials using a second portion of a flow regulator having the following inputs: the commanded output flowrate of the total materials from the first mixing vessel; an estimated output flowrate of the total materials from the first mixing vessel; and an estimated volumetric disturbance flowrate.

10. The method of claim 9, further comprising adjusting an input valve for a second material based on the commanded input flowrate of the total materials and the commanded input flowrate of the material using the flow modulator.

11. The method of claim 2, wherein the volumetric ratio observer is used to estimate the volumetric ratio of the first material to the total materials in the first mixing vessel and an output flowrate of the material from the first mixing vessel.

12. The method of claim 2, wherein the volumetric ratio observer has a total volumetric disturbance flowrate as another input, and wherein it is also used to estimate the volume of the total materials in the first mixing vessel.

13. The method of claim 2, wherein the height observer comprises a PI controller.

14. The method of claim 13, wherein the height observer further comprises an Integral controller coupled to the PI controller.

15. The method of claim 2, wherein the volumetric ratio observer comprises first and second Integral controllers.

16. The method of claim 1, wherein the total materials comprise water and cement.

17. The method of claim 1, being implemented by a computerized system or by hardware.

18. The method of claim 1, wherein the total materials comprise a fluid and a gas-transported dry material.

19. A method of controlling a volumetric ratio of a first material to total materials in a first mixing vessel that is partially separated from a second mixing vessel, comprising:

estimating the volumetric ratio of the first material to the total materials in the second mixing vessel, an output flowrate of the first material from the first mixing vessel, and a volumetric disturbance flowrate of the first material using a volumetric ratio observer having the following inputs: a commanded input flowrate of the first material and a measured input flowrate of the first material;

computing a commanded output flowrate of the first material from the first mixing vessel using a state feedback controller having the following inputs: a commanded volumetric ratio of the first material to the total materials in the second mixing vessel and the estimated volumetric ratio of the first material to the total materials in the second mixing vessel;

dynamically recomputing the commanded input flowrate of the first material using a flow regulator having the following inputs: an estimated input flowrate error of the first material and the estimated output flowrate of the first material from the first mixing vessel; and adjusting an input valve of the first material based on the commanded input flowrate of the first material using a flow modulator that transforms the commanded input flow rate and the commanded volumetric ratio of the first material to total materials into positions of the input valve, and so volumetrically control the input valve utilizing the estimated volumetric ratio;

wherein the volumetric ratio observer provides filtered, zero-lag estimates of the actual volumetric ratios of materials in the second mixing vessel by mathematical modeling that includes a modeled volumetric flowrate disturbance component.

20. A method of controlling a volumetric ratio of a first material to total materials in a first mixing vessel that is partially separated from a second mixing vessel, comprising:

estimating a total volumetric disturbance flowrate, the volumetric ratio of the first material to the total materials in the first mixing vessel, and an output flowrate of the first material from the first mixing vessel using a volumetric ratio observer having the following inputs: a measured height of the total materials in the second mixing vessel; a measured input flowrate of the first material; and a commanded input flowrate of a second material that is also being fed to the first mixing vessel;

dynamically recomputing a commanded input flowrate of the first material using a flow regulator having the following inputs: a commanded volumetric ratio of the first material to the total materials in the first mixing vessel; an estimated volumetric ratio of the first material to the total materials in the first mixing vessel; and the estimated output flowrate of the first material from the first mixing vessel; and adjusting an input valve of the first material based on the commanded input flowrate of the first material using a flow modulator that transforms a commanded input flow rate and the commanded volumetric ratio of the first material to total materials into positions of the input valve, and so volumetrically control the input valve utilizing the estimated volumetric ratio;

wherein the volumetric ratio observer provides filtered, zero-lag estimates of the actual volumetric ratios of materials in the first mixing vessel by mathematical modeling that includes a modeled volumetric flowrate disturbance component.

* * * * *